US010341915B2

(12) United States Patent
Bhumkar et al.

(10) Patent No.: US 10,341,915 B2
(45) Date of Patent: Jul. 2, 2019

(54) WIRELESS COMMUNICATION MANAGEMENT AND HANDOFFS

(71) Applicant: Time Warner Cable Enterprises LLC, New York, NY (US)

(72) Inventors: Sunmeel Bhumkar, Clarksburg, MD (US); Muhib Oduwaiye, Clarksburg, MD (US); Zaheer Syed, Ashburn, VA (US); Sourabh Gupta, Ashburn, VA (US); Syed Ahsan, Manassas, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 562 days.

(21) Appl. No.: 14/953,808

(22) Filed: Nov. 30, 2015

(65) Prior Publication Data

US 2017/0156093 A1     Jun. 1, 2017

(51) Int. Cl.
*H04W 36/08*     (2009.01)
*H04W 36/00*     (2009.01)
*H04W 76/11*     (2018.01)

(52) U.S. Cl.
CPC ........ *H04W 36/08* (2013.01); *H04W 36/0011* (2013.01); *H04W 36/0061* (2013.01); *H04W 76/11* (2018.02)

(58) Field of Classification Search
CPC .................................................... H04W 36/08
USPC ........................................................ 370/330
See application file for complete search history.

(56) References Cited

U.S. PATENT DOCUMENTS

| | | | |
|---|---|---|---|
| 2002/0085719 A1* | 7/2002 | Crosbie | H04W 36/0011 380/248 |
| 2005/0272430 A1* | 12/2005 | Griebling | H04W 84/22 455/446 |
| 2006/0029028 A1* | 2/2006 | Kim | H04W 84/12 370/338 |

* cited by examiner

*Primary Examiner* — Samina F Choudhry
(74) *Attorney, Agent, or Firm* — Armis IP Law, LLC

(57) ABSTRACT

To facilitate a handoff of a communication session in a wireless network, a first wireless access point at least temporarily emulates a second wireless access point, spoofing a target communication device that communications transmitted from the first wireless access point appear to be transmitted from the second wireless access point. According to a first configuration, the communication session is handed off from the first wireless access point to the second wireless access point. According to another configuration, the communication session is handed off from the second wireless access point to the first wireless access point.

35 Claims, 15 Drawing Sheets

WIRELESS COMMUNICATION MANAGEMENT AND HANDOFFS

BACKGROUND

Conventional computer devices typically have the ability to identify a presence of available WiFi™ access points. For example, according to current technology, to learn of one or more access points in a region, a computer device can listen for so-called beacons from wireless access points indicating their identities (a.k.a., SSIDs).

In addition to or as an alternative to monitoring beacons, a communication device can be configured to transmit a wireless query signal (e.g., a probe request) in a region. In response to the wireless query signal, any of one or more active WiFi™ network access points in the region will respond with information indicating their identities (a.k.a., SSIDs). In certain instances, a respective SSID is a human-readable network name assigned to a respective network. Accordingly, via the response information from the access points, the operator of a computer, or the computer itself can be configured to identify which, if any, WiFi™ networks are available for use in the region.

Subsequent to establishing a wireless communication link with a first wireless access point and communicating through the first wireless access point to access a remote network such as the Internet, assume that the respective user roams outside a coverage region provided by the first wireless network into a wireless coverage provided by a second wireless access point. In such an instance, the communication system initiates a handoff of the wireless communication link between the corresponding mobile computer device and the first wireless access point in favor of establishing a new wireless communication link between the mobile computer device and the second wireless access point.

BRIEF DESCRIPTION OF EMBODIMENTS

Use of conventional wireless networks suffer from a number of deficiencies. For example, according to conventional techniques of performing handoffs in a wireless network, there is a certain amount of downtime during a wireless handoff in which the mobile computer device is unable to communicate with a target network such as the Internet. As a more specific example, conventional wireless handoffs sometimes include first terminating a wireless communication link with a first wireless access point and then establishing a new wireless communication link with a second wireless access point. To establish the original wireless communication link in the new wireless communication link during the handoff, certain conventional techniques require that the corresponding mobile computer device be authenticated in each case. This means that, during the handoff, the mobile computer device will experience downtime in which the mobile computer device is unable to access the Internet. Downtime is often undesirable to a respective user because the communications may be critical.

In contrast to conventional techniques, embodiments herein provide novel ways of performing handoff management of communication sessions from one wireless access point to another, reducing a downtime of a user and corresponding device not being connected to a remote network (such as the Internet) during the handoff.

First Embodiments

More specifically, in one illustrative embodiment, a communication device such as a client initially establishes a communication session with a first wireless access point. This can include establishing keys to securely communicate between the communication device and the first wireless access point.

Assume that a management resource monitors the communication device and corresponding wireless network environment and detects a need to handoff the client device from the first wireless access point (which is assigned a first unique identity such as APBR1) to a second wireless access point (which is assigned a second unique identity such as APBR2) in a wireless network environment.

The decision to perform a handoff can be made for any number of reasons such as that the first wireless access point is overloaded with other client communication sessions, the communication device roams outside of a wireless coverage region provided by the first wireless access point into a wireless coverage region provided by the second wireless access point, etc.

In accordance with embodiments herein, to facilitate the handoff, the management resource notifies the second wireless access point of the handoff as well as corresponding communication settings used by the first wireless access point to support communications with the client device. Providing notification of the communication settings ensures that the second wireless access point will be able to use the same settings and provide a seamless handoff of the communication session associated with communication device.

Prior to starting the handoff, the first wireless access point transmits a first set of wireless communications (such as data payload associated with the communication session) to the communication device over a first wireless channel. In one embodiment, each communication in the first set includes a source identifier such as APBR1 (assigned to the first wireless access point), indicating that such communications originate from the first wireless access point. Each communication in the first set can further include a destination identifier of the communication device, indicating that such communications are targeted for delivery to the communication device. Via the source identifier and the destination identifier in each wireless communication, the communication device is able to identify which communications transmitted by the first wireless access point are targeted to itself.

To further facilitate the handoff, in one embodiment, the first wireless access point or other suitable resource notifies the communication device of an identity change from APBR1 (assigned to the first wireless access point) to APBR2 (assigned to the second wireless access point). This informs the communication device that subsequent communications (such as a second set of communications) from the first wireless access point will be generated to have a source identifier value of APBR2 instead of source identifier value APBR1. To this end, in one embodiment, the first wireless access point emulates the second wireless access point to generate the second set of communications. In other words, the first wireless access point would normally use the source identifier value of APBR1 to transmit communications to the communication device. During emulation, and handoff, use of the source identifier value APBR2 by the first wireless access point to generate communications spoofs the communication device into believing that such communications originate from the second wireless access point even though the first wireless access point originates and transmits such communications to the communication device.

To complete the handoff of the communication session to the second wireless access point, the first wireless access point or other suitable resource notifies the communication device and the second wireless access point (such as via a channel change command) that the communication device is now required to receive further communications associated with the communication session from a second wireless communication channel assigned to convey communications generated by the second wireless access point.

In response to receiving the channel change command, the second wireless access point uses its assigned identity value APBR2 to encode and transmit continued communications associated with the communication session to the communication device. Because the second wireless access point has now taken over the communication session, (i.e., the handoff occurs), the first wireless access point discontinues transmitting wireless communications to the communication device.

Accordingly, the first wireless access point can be configured to at least temporarily emulate a second wireless access point, spoofing the communication device into believing that the communications are transmitted from the second wireless access point. The subsequent channel change completes the handoff of the communication session from the first wireless access point to the second wireless access point.

In one embodiment, because the second wireless access point receives communication settings associated with the communication session in a manner as previously discussed, the handoff is seamless. That is, there is no need for the communication device to further authenticate and/or associate itself with the second wireless access point to create a new wireless communication session because the prior authentication, association, and security information associated with the communication session and used by the first wireless access point carry over with the communication session to the second wireless access point that uses the communication setting information to maintain the communication session.

Second Embodiments

In accordance with another illustrative embodiment, a client device initially establishes a communication session with a first wireless access point. This can include establishing keys for use by the communication session between the communication device and the first wireless access point in a manner as previously discussed.

Assume that a management resource monitors attributes (such as a location) of the communication device and corresponding wireless network environment and detects a need to handoff the client device from the first wireless access point (assigned a first unique identity such as APBR1) to a second wireless access point (assigned a second unique identity such as APBR2) in the wireless network environment.

The decision to perform a handoff can be made for any number of reasons such as that the first wireless access point is overloaded with communication sessions from other communication devices, the communication device roams outside of a wireless coverage region provided by the first wireless access point into a wireless coverage region provided by the second wireless access point, and so on.

To facilitate the handoff, the management resource communicates with the second wireless access point to schedule and/or perform the handoff. Additionally, the management resource communicates corresponding communication settings used by the first wireless access point to take over communications with the client device. This ensures that the second wireless access point receiving the communication session will be able to complete a seamless handoff of the communication session associated with communication device.

Prior to the handoff, assume that the first wireless access point transmits a first set of wireless communications over a first wireless channel to the communication device. In one embodiment, each communication in the first set includes a source identifier such as APBR1 (assigned to the first wireless access point). The unique identifier value APBR1 indicates that such communications originate from the first wireless access point. Each communication in the first set further includes the destination identifier (of the communication device) indicating that the communications are targeted for delivery to the communication device. Accordingly, the communication device is able to identify which communications transmitted by the first wireless access point are targeted to itself.

To further facilitate the handoff, in one embodiment, the first wireless access point or other suitable resource generates a channel change command to notify the communication device to receive communications associated with the corresponding communication session over a second wireless channel instead of the first wireless channel.

The wireless access point also notifies the second wireless access point of the channel change. The notification of channel change causes the second wireless access point to emulate the first wireless access point in which the second wireless access point generates a second set of communications associated with the communication session to the communication device over the second wireless channel using the source identifier assigned to the first wireless access point. In other words, the second wireless access point would not normally use the source identifier value of APBR1 to transmit communications to the communication device. However, during emulation, use of the source identifier value APBR1 assigned to the first wireless access point to generate the second set of communications from the second wireless access point spoofs the communication device into believing that the second set of communications originates from the first wireless access point even though the second wireless access point originates and transmits the second set of communications to the communication device.

To complete the handoff, the second wireless access point or other suitable resource notifies the communication device of an identity change from APBR1 (assigned to the first wireless access point) to APBR2 (assigned to the second wireless access point). This identity change notification informs the communication device that subsequent communications (such as a third set of communications) associated with the communication device's current communication session over the second wireless channel will be generated to have a source identifier value of APBR2 instead of source identifier value APBR1.

Accordingly, the second wireless access point can be configured to at least temporarily emulate the first wireless access point, spoofing the communication device into believing that corresponding communications are transmitted from the first wireless access point. The notification (indicating change in identity of the wireless access point associated with the communication session) transmitted to the communication device completes the handoff of the communication session from the first wireless access point to the second wireless access point.

In one embodiment, as previously discussed, because the second wireless access point is provided communication settings associated with the communication session, the handoff is seamless. That is, there is no need for the communication device to newly authenticate and/or associate itself with the second wireless access point to create a new wireless communication session because the prior authentication and association with the first wireless access point (or even prior wireless access point) carry over with the communication session to the second wireless access point now managing the handed off communication session.

Third Embodiments

In accordance with further embodiments, a communications system includes: a first wireless access point and a second wireless access point. The first wireless access point is operable to receive a notification to perform a handoff of a wireless communication session from the first wireless access point to the second wireless access point. In one embodiment, the communication session supports communications with a communication device. During a handoff, the first wireless access point at least temporarily generates wireless communications to the communication device to spoof the communication device such that it appears as though the wireless communications are being transmitted from the second wireless access point, even though the first wireless access point generates and transmits the wireless communications.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium (media) such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, computer processor hardware, executable code, etc., that supports operations as discussed herein.

One or more embodiment as described herein includes a computer readable storage medium, system, hardware, etc., having instructions stored thereon. The instructions, when executed by computer processor hardware (such as associated with a user-operated communication device), cause the computer processor hardware of the system to execute operations of: establishing a wireless communication link with a first wireless access point; and receiving first communications that are encoded to indicate that the first communications are transmitted from a first wireless access point in the wireless network to the communication device, the communication device receiving a first portion of the first communications from the first wireless access point in the wireless network, the communication device receiving a second portion of the first communications from a second wireless access point in the wireless network that emulates the first wireless access point.

Another embodiment as described herein includes computer readable storage medium, system, hardware, etc., having instructions stored thereon. The instructions, when executed by computer processor hardware (such as associated with one or more wireless access points), cause the computer processor hardware of the system to execute operations of: establishing a wireless communication link with a communication device in the wireless network; and transmitting first communications that are encoded to indicate that the first communications are transmitted from a first wireless access point in the wireless network to the communication device, a first portion of the first communications transmitted from the first wireless access point, a second portion of the first communications transmitted from a second wireless access point in the wireless network that emulates the first wireless access point.

Another embodiment as described herein includes computer readable storage medium, system, hardware, etc., having instructions stored thereon. The instructions, when executed by computer processor hardware (such as associated with a communication device), cause the computer processor hardware of the system to execute operations of: receiving first unique identifier value assigned to a first wireless access point in the wireless network, the first unique identifier value indicating an identity of the first wireless access point; establishing a first wireless communication link to receive first communications transmitted from the first wireless access point; receiving a notification indicating an identity change from the first unique identifier value to second unique identifier value; and utilizing the second unique identifier value to receive second communications from the first wireless access point over the first wireless communication link.

Another embodiment as described herein includes computer readable storage medium, system, hardware, etc., having instructions stored thereon. The instructions, when executed by computer processor hardware (such as associated with one or more wireless access points), cause the computer processor hardware of the system to execute operations of: utilizing a first unique identifier value assigned to a first wireless access point to establish a first wireless communication link with a communication device; transmitting first communications from the first wireless access point to the communication device, the first communications encoded to include the first unique identifier value; providing notification to the communication device indicating an identity change from the first unique identifier value to a second unique identifier value; and in accordance with the notification, transmitting second communications from the first wireless access point to the communication device, the second communications encoded to include the second unique identifier value instead of the first unique identifier value.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for supporting handoffs of respective communication sessions in a wireless network. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional summary details and/or possible perspectives (permutations) of the invention(s), the reader is directed to the Detailed Description section and corresponding figures of the present disclosure as further discussed below.

Figure 1:
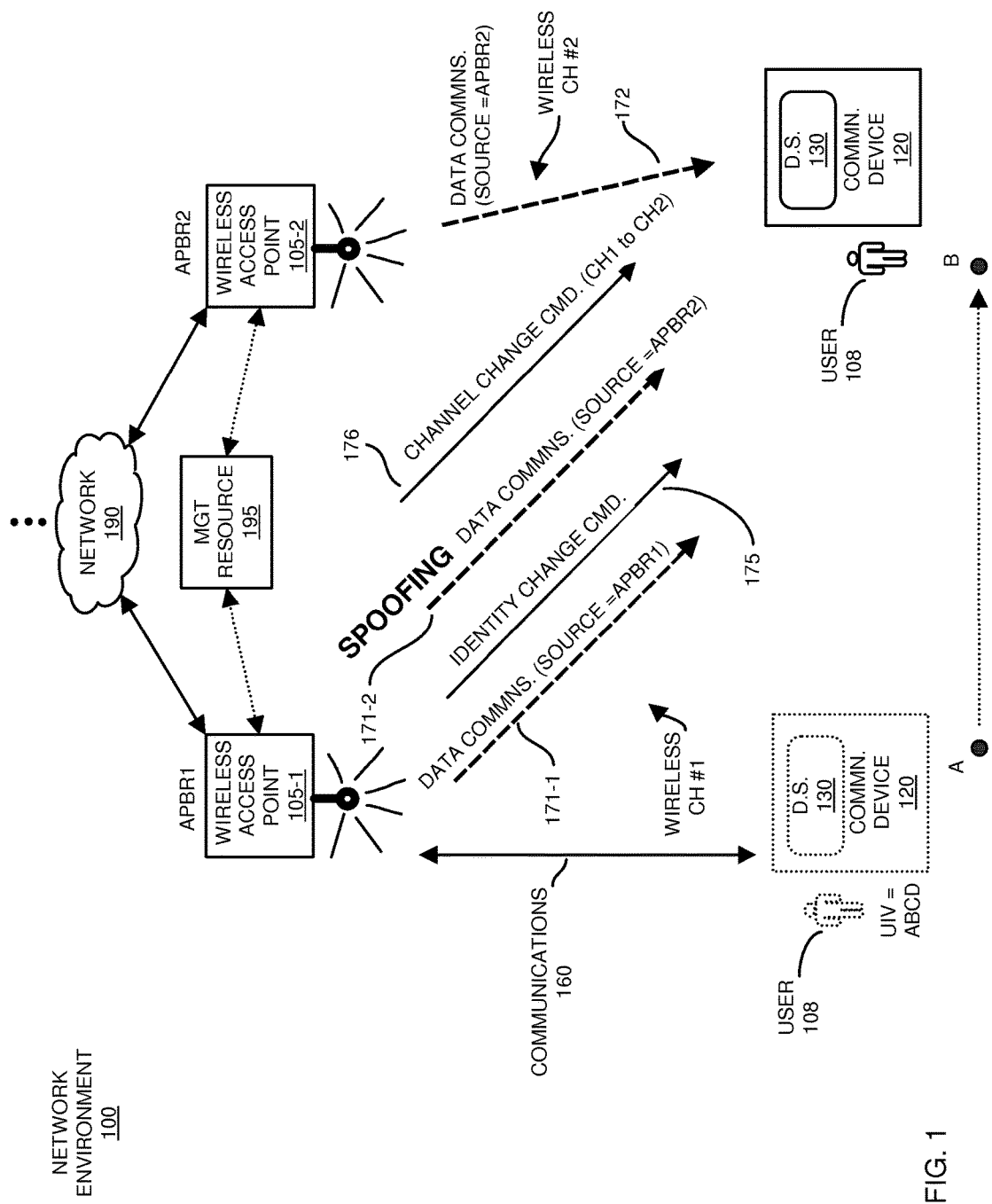
FIG. 1 is an example diagram illustrating a handoff of a communication session from a first wireless access point to a second wireless access point according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, to facilitate a handoff of a communication session in a wireless network, a first wireless access point at least temporarily emulates operations of a second wireless access point to spoof a target communication device that communications transmitted from the first wireless access point appear to be transmitted from the second wireless access point. As further described herein, spoofing can be performed by either the wireless access point from which the corresponding communication session is being handed off or the wireless access point receiving the handed off communication session.

Now, more specifically, FIG. 1 is an example diagram illustrating a network environment according to embodiments herein.

Note that each of the resources in network environment 100 including wireless access point 105-1, wireless access point 105-2, etc., management resource 195, communication device 120, etc., represents and/or includes appropriate hardware, software, or a combination of hardware and software to carry out functionality as discussed herein.

In one embodiment, each of the wireless access points 105 in network environment 100 facilitate connectivity to corresponding network 190 such as the Internet. For example, to access network 190, communication device 120 establishes a wireless communication link with a corresponding wireless access point. In an upstream direction, the wireless access point conveys communications from the communication device 120 to one or more server resources in network 190. In a downstream direction, the wireless access point conveys communications from one or more server resources in network 190 over the wireless communication link to communication device 120.

In one embodiment, network 190 includes or is a packet-switched network facilitating distribution of communications (such as one or more data packets) in accordance with any suitable communication protocol. As a specific example embodiment, network 190 and corresponding resources therein support client/server communications and switching of data packets using source and destination address information. For example, the source address of a communication such as a data packet indicates a corresponding resource from which the data packet is generated. A destination address of a communication (data packet) indicates a corresponding address of the resource to which the data packet is being transmitted. Each of the resources in network 190 use the destination address to route the respective data packets to an identified destination. The recipient (destination) of the communication uses the source address (associated with a respective communication device) to identify a particular client that transmitted the communication.

By further way of non-limiting example embodiment, a communication device (such as a mobile communication device or client device) and a respective wireless access point can communicate (over respective communication links) in accordance with WiFi™ standards such as IEEE (Institute of Electrical and Electronics Engineers) 802.11a, 802.11b, 802.11g, 802.11n, etc. However, note that wireless communications are not limited to transmission via WiFi™ standards and protocols. Instead, communication device 120 and wireless access points 105 can be configured to communicate in accordance with any suitable wireless communication standard.

In this example embodiment, the wireless access point 105-1 is assigned unique identifier information APBR1 (which can represent network address information, SSID name, etc.). Users and corresponding communication devices in network environment 100 utilize the unique identifier information as a basis in which to perform functions such as identify the wireless access point 105-1 amongst other wireless access points, establish a connection with the wireless access point 105-1, receive communications from the wireless access point 105-1, transmit communications to the wireless access point 105-1, etc.

In accordance with a first illustrative embodiment, via communications 160, assume that the communication device 120 such as a client device initially establishes a wireless communication link with the wireless access point 105-1.

Communications 160 can include transmission of a probe request from the communication device 120 to the wireless access point 105-1. In response to receiving the probe request, the wireless access point 105-1 forwards a probe response to the communication device 120. The probe response can include any suitable information notifying the communication device 120 of the availability of wireless access point 105-1 in network environment 100.

In furtherance of establishing a communication session to access network 190, via communications 160, the communication device 120 generates and transmits an authentication request to the wireless access point 105-1. The communication device 120 receives an authentication response from the wireless access point 105-1. Via back-and-forth authentication type communications between the wireless access point 105-1 and the communication device 120, the communication device 120 is authenticated for establishing a corresponding wireless communication link with the wireless access point 105-1.

Subsequent to authentication, the communication device 120 generates and transmits an association request to the wireless access point 105-1. The communication device 120 receives an association response from wireless access point 105-1 to establish a wireless communication link.

Note that the authentication and association functions as previously discussed are shown by way of non-limiting example only. Communications 160 can include any suitable back-and-forth communications facilitating creation of one or more wireless communication links between the communication device 120 and the wireless access point 105-1.

In one embodiment, the wireless communication link established between the communication device 120 and the wireless access point 105-1 is a secured communication link. In such an instance, communications 160 facilitate configuring the communication device 120 and the wireless access point 105-1 with appropriate keys that are to be applied to subsequent communications conveyed over the corresponding wireless communication link.

As further shown, the communication device is assigned unique identifier information ABCD. Wireless access point 105-1 is assigned unique identifier information APBR1. Management resource 195 facilitates conveyance of the identity information APBR1 associated with first wireless access point 105-1 to second wireless access point 105-2.

When communicating data from the wireless access point 105-1 to the communication device 120, the wireless access point 105-1 encodes the wirelessly transmitted messages to include a source identifier such as APBR1, indicating that the wireless access point 105-1 transmits such communications. Additionally, the wireless access point 105-1 encodes the wirelessly transmitted messages to include a destination identifier such as ABCD, indicating that the wireless messages are directed to the communication device 120.

As further shown, wireless access point 105-1 encodes communications 171-1 (such as a first portion of video data) destined to communication device 120 to include a source identifier of APBR1. Wireless access point 105-1 transmits the communications 171-1 over the wireless channel #1 in accordance with communications settings associated with the corresponding communication session. As previously discussed, the communication device 120 monitors wireless channel #1 for communications 171-1 from wireless access point 105-1.

Further in this example embodiment, subsequent to establishing the wireless communication link and corresponding wireless communication session between the communication device 120 and the wireless access point 105-1, assume that the user 108 operating the communication device 120 roams from location A to location B in network environment 100.

As further shown, network environment 100 includes management resource 195 to make decisions regarding handoffs with respect to the communication devices in network environment 100.

In this example embodiment, the management resource 195 monitors the communication device 120 and corresponding wireless network environment 100 and detects a need to handoff the communication device 120 and corresponding communication session from the wireless access point 105-1 (assigned a first unique identity such as APBR1) to wireless access point 105-2 (assigned a second unique identity such as APBR2) in network environment 100.

Note that the decision to perform the handoff of the communication device's (120) communication session from wireless access point 105-1 to wireless access point 105-2 can be made for any number of reasons such as because: the first wireless access point 105-1 is overloaded with handling other client communication sessions, the communication device 120 roams outside of a wireless coverage region provided by the first wireless access point 105-1 into a wireless coverage region provided by the second wireless access point 105-2, detection of interference, detection of a high bit error rate associated with wireless communications between the wireless access point 105-1 and the communication device 120, etc.

To facilitate the handoff, the management resource 195 notifies the second wireless access point 105-2 of communication session information such as a session identifier associated with the communication session, encryption keys established to support the communication session, channel on which the handoff will occur (wireless channel #2 in this case), buffered communication session information, etc.

Providing the second wireless access point 105-2 notification of the handoff information such as communication settings associated with the communications session ensures that the second wireless access point will be able to use the same settings and provide a seamless handoff of the communication session associated with communication device.

As previously discussed, prior to handoff, the first wireless access point 105-1 transmits a first set of one or more wireless communications 171-1 (such as data packets, each including a respective data payload associated with the communication session) to the communication device 120 over wireless channel #1.

Each communication in the set of communications 171-1 includes a source identifier such as APBR1 (assigned to the first wireless access point 105-1), indicating that such communications 171-1 originate from the first wireless access point 105-1. As previously discussed, each of the communications 171-1 can further include a destination identifier (such as ABCD) of the communication device 120 indicating that such communications 171-1 are targeted for delivery to the communication device 120.

Via the source identifier APBR1 and the target identifier ABCD in each wireless communication, the communication device 120 is able to identify which communications transmitted by the first wireless access point 105-1 are targeted to itself.

To further facilitate the handoff, in one embodiment, the first wireless access point 105-1 temporarily spoofs the communication device 120 during the handoff. For example, in one embodiment, via transmission of notification 175 (such as an identity change command) to the communication device 120, the wireless access point 105-1 notifies the communication device 120 of an identity change from APBR1 (assigned to the first wireless access point 105-1) to APBR2 (which is an identity of the second wireless access point 105-2).

Subsequent to and in response to receiving the notification 175 indicating the identity change, the communication device 120 discontinues use of the first unique identifier APBR1 to monitor and receive the first communications 171-1 from the first wireless access point 105-1.

Transmission of the notification 175 informs the communication device 120 that subsequent communications 171-2 (such as a second set of communications) with respect to the communication device's current communication session will be generated to have a source identifier value of APBR2 instead of source identifier value APBR1. In one embodiment, the first wireless access point 105-1 emulates the second wireless access point 105-2 to generate the second set of communications 171-2.

Note that the first wireless access point 105-1 would not normally use the source identifier value of APBR2 to transmit communications to the communication device 120 because the wireless access point 105-1 is assigned unique identifier information APBR1. During emulation (and spoofing as described herein), temporary use of the source identifier value APBR2 by the first wireless access point 105-1 to generate communications 171-2 causes the communication device 120 to believe that such communications 171-2 originate from the second wireless access point 105-2 even though the first wireless access point 105-1 happens to originate and transmit the communications 171-2 to the communication device 120.

Thus, in accordance with further embodiments, the first wireless access point 105-1 transmits both the first set of communications 171-1 (each of which include identifier APBR1 indicating origination from the first wireless access point 105-1) and the second set of communications 171-2 generated during emulation (each of which include identifier APBR2 indicating origination and transmission from the second wireless access point 105-2) over monitored wireless channel #1.

To complete the handoff of the communication session to the second wireless access point 105-2, the first wireless access point 105-1 or other suitable resource transmits command 176 (such as a channel change command) over wireless channel #1 to the communication device 120 to notify the communication device 120 and the second wireless access point 105-2 that the communication device 120 is thereafter going to receive further communications 172 associated with the communication session over wireless channel #2, which is assigned to convey communications generated by the second wireless access point 105-2.

In one embodiment, the communication device 120 provides an acknowledgment of receiving the command 176 to the first wireless access point 105-1. The first wireless access point 105-1 notifies the management resource 195 that the communication device 120 received the communication management and is now tuning to monitor wireless channel #2 for communications. The acknowledgment triggers the management resource 195 to notify the second wireless access point 105-2 of the acknowledgment of the communication device 120 to further complete the handoff.

In response to receiving notification of the channel change command 176, the communication device 120 monitors wireless channel #2 for communications from the second wireless access point 105-2. The second wireless access point 105-2 uses its assigned identity value APBR2 to transmit continued communications 172 associated with the communication session to the communication device 120 over wireless channel #2. Because the second wireless access point 105-2 has now taken over the communication session, the first wireless access point 105-1 discontinues transmitting any further wireless communications to the communication device 120.

Accordingly, during the handoff, the first wireless access point 105-1 can be configured to at least temporarily emulate a second wireless access point 105-2, spoofing the communication device 120 into believing that the communications 171-2 are transmitted from the second wireless access point 105-2. Subsequent notification of the channel change command 176 notifying the communication device to monitor wireless channel #2 instead of wireless general #1 completes the handoff of the communication session from the first wireless access point 105-1 to the second wireless access point 105-2.

Because the second wireless access point 105-2 is provided communication settings associated with the communication session in a manner as previously discussed, the handoff is seamless. That is, there is no need for the communication device 120 to further authenticate and/or associate itself with the second wireless access point 105-2 to create a new wireless communication session or wireless communication link for the handoff to occur because the prior authentication and association and security information associated with the first wireless access point 105-1 carry over with the communication session to the second wireless access point 105-2 now managing the communication session.

Figure 2:
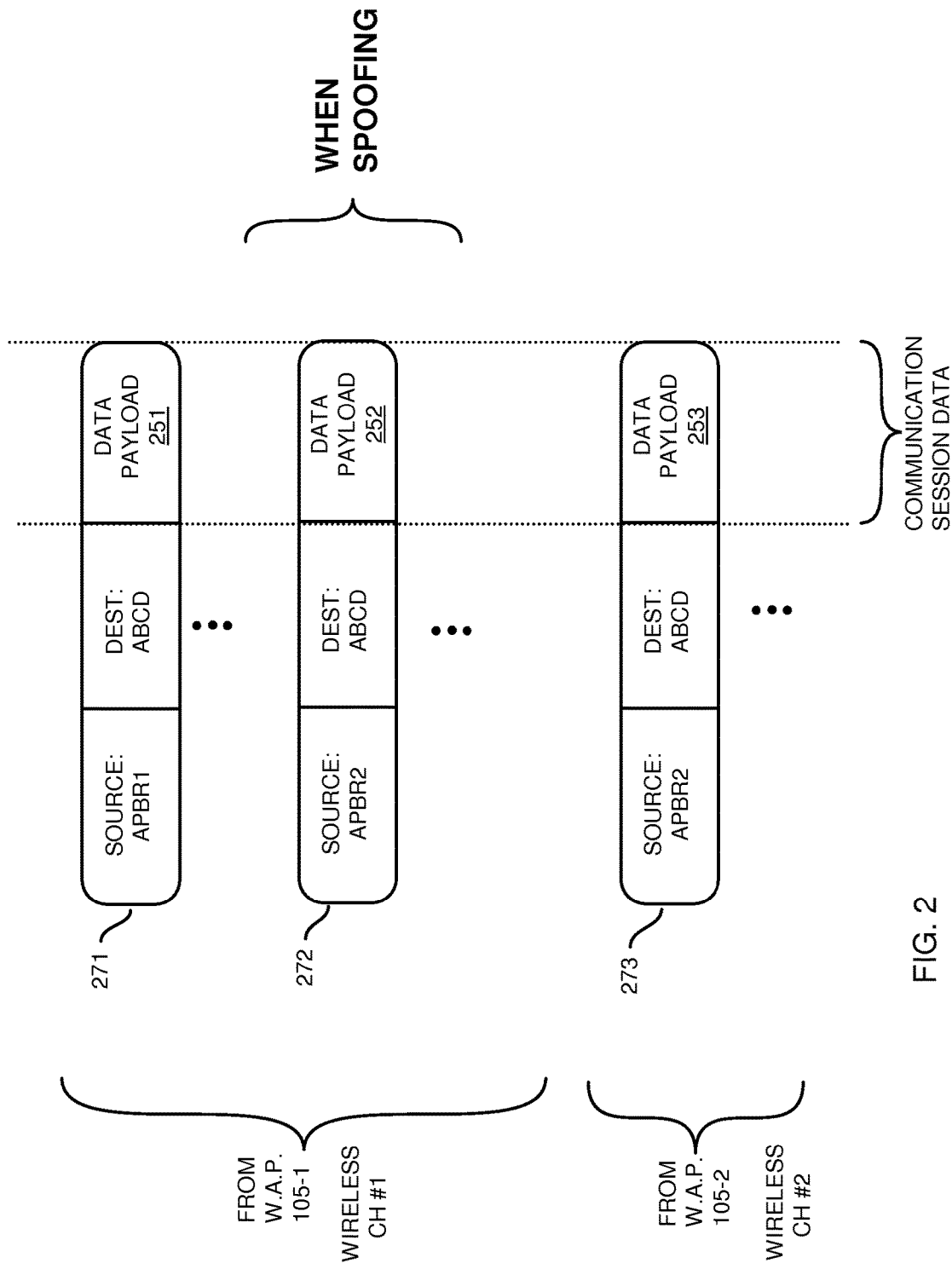
FIG. 2 is an example diagram illustrating attributes of communications associated with a communication session handed off from a first wireless access point to a second wireless access point according to embodiments herein.

FIG. 2 is an example diagram illustrating communications associated with a communication session handed off from a first wireless access point to a second wireless access point according to embodiments herein.

In this example embodiment, message 271 represents one of the multiple communications 171-1 transmitted from the wireless access point 105-1 over wireless channel #1 to the communication device 120 prior to spoofing; message 272 represents one of the multiple communications 171-2 transmitted over wireless channel #1 from the wireless access point 105-1 to the communication device 120 during spoofing; message 273 represents one of the multiple communications 172 transmitted over wireless channel #2 from the wireless access point 105-1 to the communication device 120 after spoofing and channel change.

Respective data payloads in the communications can represent any type of data. For example, in one embodiment, data payload 251 represents the first portion of a retrieved video stream associated with the communication session; data payload 252 represents a second portion of the retrieved video stream associated with the communication session; data payload 253 represents a third portion of the retrieved video stream associated with the communication session.

Figure 3:
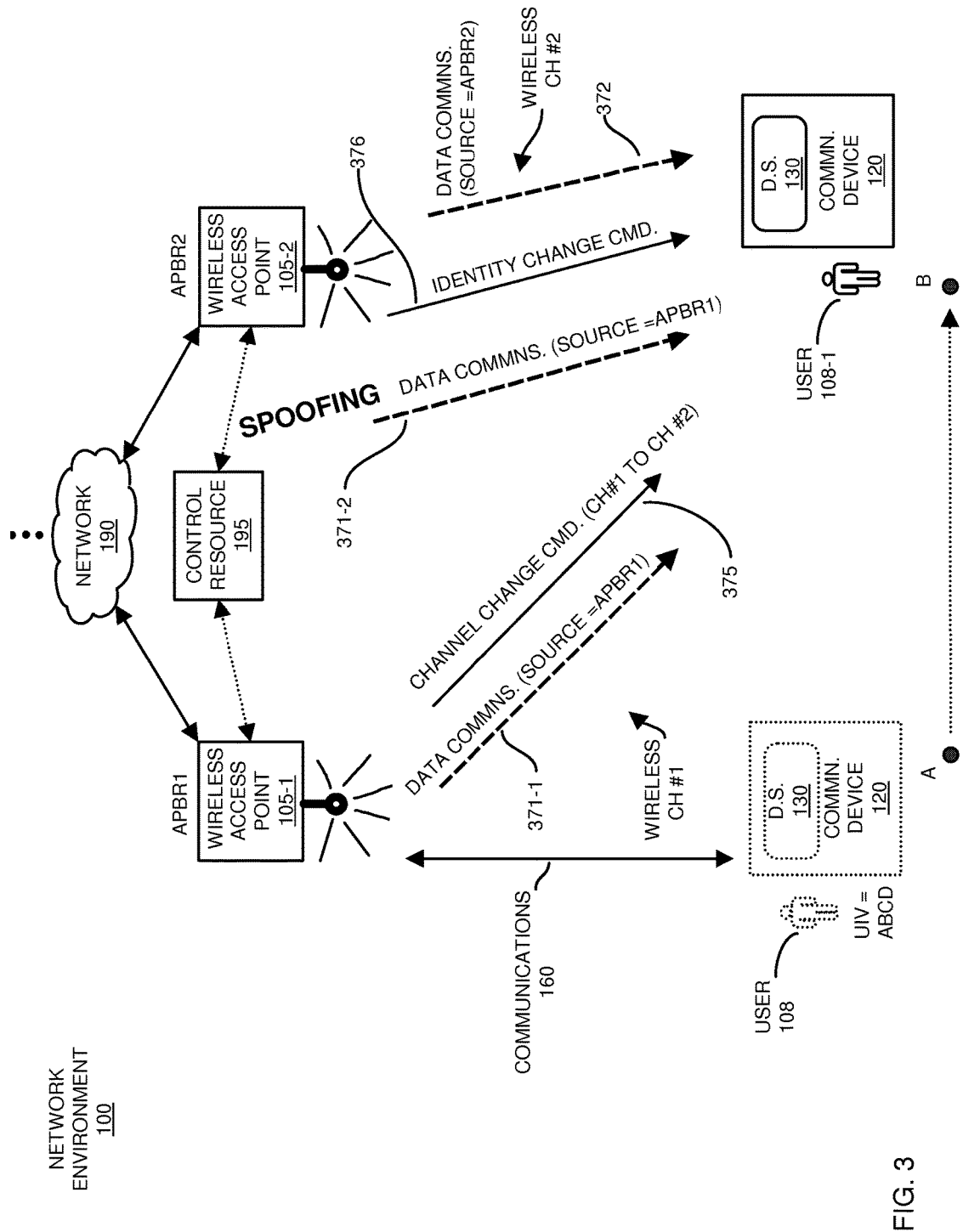
FIG. 3 is an example diagram illustrating a handoff of a communication session from a first wireless access point to a second wireless access point according to embodiments herein.

FIG. 3 is an example diagram illustrating a handoff of a communication session from a first wireless access point to a second wireless access point according to embodiments herein.

In a manner as previously discussed, via communications 160, the communication device 120 establishes a respective communication link with the wireless access point 105-1.

In one embodiment, the wireless communication link established between the communication device 120 and the wireless access point 105-1 is a secured communication link. In such an instance, communications 160 facilitate configuring the communication device 120 and the wireless access point 105-1 with appropriate keys that are to be applied to subsequent communications conveyed over the corresponding wireless communication link.

As further shown, the communication device 120 is assigned unique identifier information ABCD. Wireless access point 105-1 is assigned unique identifier information APBR1.

During normal non-handoff operation, when communicating data from the wireless access point 105-1 to the communication device 120, the wireless access point 105-1 encodes the wirelessly transmitted messages to include a source identifier such as APBR1, indicating that the wireless access point 105-1 transmits such communications. Additionally, the wireless access point 105-1 encodes the wirelessly transmitted messages to include a destination identifier such as ABCD, indicating that the wireless messages are directed to the communication device 120.

As further shown, wireless access point 105-1 encodes communications 371-1 destined to communication device 120 to include a source identifier of APBR1. Wireless access point 105-1 transmits the communications 371-1 over the wireless channel #1 in accordance with communications settings associated with the corresponding communications session. The communication device 120 monitors wireless channel #1 in order to receive communications 371-1 from wireless access point 105-1.

Further in this example embodiment, subsequent to establishing the wireless communication link and corresponding wireless communication session between the communication device 120 and the wireless access point 105-1, assume that the user 108 operating the communication device 120 roams from location A to location B in network environment 100.

As further shown, network environment 100 includes management resource 195 to make decisions regarding handoffs with respect to the communication devices in network environment 100.

In this illustrative example, in a similar manner as previously discussed, the management resource 195 monitors attributes of the communication device 120 and corresponding wireless network environment 100 and detects a need to handoff the communication device 120 from the wireless access point 105-1 (assigned a first unique identity such as APBR1) to a wireless access point 105-2 (assigned a second unique identity such as APBR2) in network environment 100.

Note that the decision to perform the handoff of the communication device's (120) communication session from wireless access point 105-1 to wireless access point 105-2 can be made for any number of reasons such as because: the first wireless access point 105-1 is overloaded with handling other client communication sessions, the communication device 120 roams outside of a wireless coverage region provided by the first wireless access point 105-1 into a wireless coverage region provided by the second wireless access point 105-2, etc.

To facilitate the handoff, the management resource 195 notifies the second wireless access point 105-2 of the intent to handoff as well as corresponding communication settings associated with the communication session as used by the first wireless access point 105-1 to support communications with the communication device 120. Providing the wireless access point 105-2 notification of the communication settings associated with the established communication session ensures that the second wireless access point 105-2 will be able to use the same settings and provide a seamless handoff of the communication session associated with communication device 120.

As previously discussed, prior to handoff, the first wireless access point 105-1 transmits a first set of one or more wireless communications 371-1 (such as data packets, each including a respective data payload associated with the communication session) to the communication device 120 over wireless channel #1.

Each communication in the set of communications 371-1 includes a source identifier such as APBR1 (assigned to the first wireless access point 105-1), indicating that such communications 371-1 originate from the first wireless access point 105-1. As previously discussed, each of the communications 371-1 can further include a destination identifier (such as ABCD) of the communication device 120 indicating that such communications 371-1 are targeted for delivery to the communication device 120.

Via the source identifier APBR1 and the target identifier ABCD in each of the wireless communications 371-1, the communication device 120 is able to identify communications 371-1 transmitted by the first wireless access point 105-1 that are targeted to itself.

In furtherance of performing the handoff of the communication session from the first wireless access point 105-1 to the second wireless access point 105-2, the first wireless access point 105-1 or other suitable resource transmits command 375 (such as a channel change command) to the communication device 120 and the second wireless access point 105-2 to notify the communication device 120 and the second wireless access point 105-2 that the communication device 120 is thereafter going to receive further communications 371-2 associated with the communication session from wireless channel #2 instead of wireless channel #1, which is newly assigned for use by wireless access point 105-2 to transmit communications 371-2 generated by the second wireless access point 105-2 to the communication device 120.

Because the second wireless access point 105-2 has now taken over the communication session, the first wireless access point 105-1 discontinues transmitting any further wireless communications to the communication device 120.

As previously discussed, in addition to providing notification of the channel change to the communication device 120, the wireless access point 105-1 and/or control resource 195 also informs wireless access point 105-2 of the channel change command. This notifies the wireless access point 105-2 when the wireless access point 105-2 is to thereafter take over transmission of communications associated with the communication session.

In response to receiving the channel change command 375, the communication device 120 expects to receive subsequent communications from wireless access point 105-1 (assigned unique identifier information APBR1) over wireless channel #2 instead of wireless channel #1.

As further shown, in response to receiving the channel change command 375 and corresponding notification of the handoff, the wireless access point 105-2 temporarily uses the unique identifier information APBR1 assigned to wireless access point 105-1 to generate and transmit wireless communications 371-2 from the wireless access point 105-2 to the communication device 120 over the wireless channel #2.

Accordingly, during the handoff, the wireless access point 105-2 can be configured to at least temporarily emulate the first wireless access point 105-1, spoofing the communication device 120 into believing that the communications 371-2 are transmitted from the first wireless access point 105-1, even though the communications 371-2 are transmitted from the wireless access point 105-2.

To complete the handoff, the wireless access point 105-2 transmits notification 376 (such as an identity change command) to the communication device 120. In one embodiment, the notification 376 informs the communication device 120 that subsequent communications to the communication device 120 will be from wireless access point 105-2, which is assigned unique identifier information APBR2. Based on the notification, the communication device 120 discontinues monitoring wireless channel #2 for communications from the wireless access point 105-1 assigned unique identifier information APBR1 and instead monitors wireless channel #2 for communications from wireless access point 105-2 encoded with unique identifier information APBR2.

Subsequent to transmission of the notification 376 to the communication device 120, the wireless access point 105-2 generates and transmits communications 372 over the wireless channel #2 to the communication device 120. The communication device 120 monitors wireless channel #2 to receive communications 372, each of which is encoded to include a source identifier of APBR2 and destination identifier of ABCD.

Note that the second wireless access point 105-2 would not normally use the source identifier value of APBR1 to transmit communications to the communication device 120 because the wireless access point 105-2 is assigned unique identifier information APBR2. However, during emulation (spoofing), temporary use of the source identifier value APBR1 by the first wireless access point 105-2 to generate communications 371-2 spoofs the communication device 120 into believing that such communications 371-2 originate from the first wireless access point 105-1 even though the second wireless access point 105-2 originates and transmits the communications 371-2 to the communication device 120.

As previously discussed, because the second wireless access point 105-2 is provided communications settings associated with the communication session in a manner as previously discussed, the handoff is seamless. That is, there is no need for the communication device 120 to further authenticate and/or associate itself with the second wireless access point 105-2 to create a new wireless communication session or wireless communication link because the prior authentication and association and security information associated with the first wireless access point 105-1 carry over with the communication session to the second wireless access point 105-2 now managing the communication session.

Figure 4:
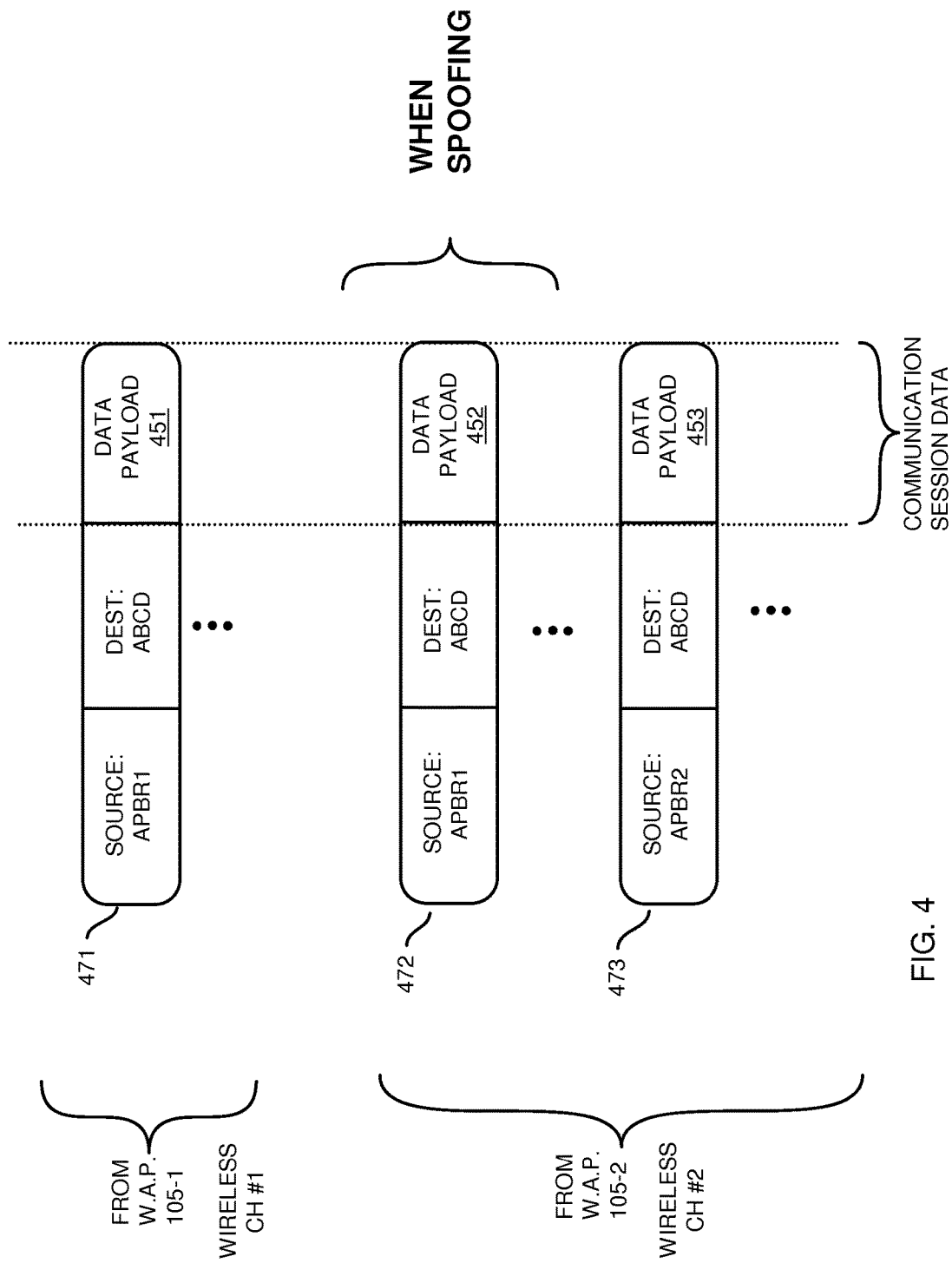
FIG. 4 is an example diagram illustrating communications associated with a communication session handed off from a first wireless access point to a second wireless access point according to embodiments herein.

FIG. 4 is an example diagram illustrating communications associated with a communication session handed off from a first wireless access point to a second wireless access point according to embodiments herein.

In this example embodiment, message 471 represents one of the multiple communications 371-1 transmitted from the wireless access point 105-1 over wireless channel #1 to the communication device 120 prior to spoofing; message 472 represents one of the multiple communications 371-2 transmitted over wireless channel #2 from the wireless access point 105-2 to the communication device 120 during spoofing; message 473 represents one of the multiple communications 372 transmitted over wireless channel #2 from the wireless access point 105-2 to the communication device 120 after spoofing.

Respective data payloads in the communications can represent any type of data. For example, in one embodiment, data payload 451 represents the first portion of a retrieved video stream associated with the communication session; data payload 452 represents a second portion of the retrieved video stream associated with the communication session; data payload 453 represents a third portion of the retrieved video stream associated with the communication session.

Figure 5:
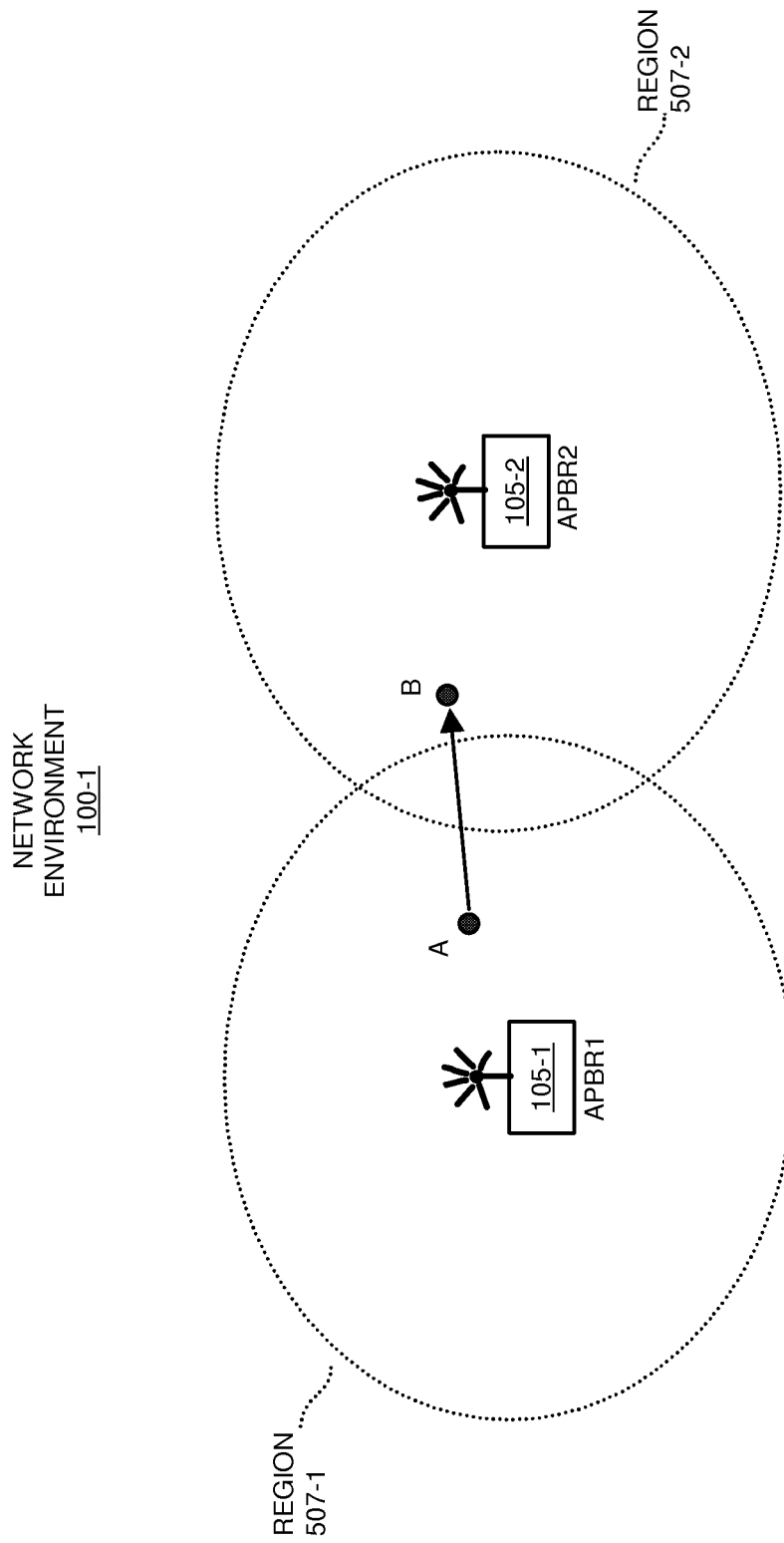
FIG. 5 is an example diagram illustrating regions of wireless coverage provided by multiple wireless access points and the corresponding handoff of a communication session from a first wireless access point to a second wireless access point according to embodiments herein.

FIG. 5 is an example diagram illustrating different regions of wireless coverage provided by multiple wireless access points in the corresponding handoff from a first wireless access point to a second wireless access point according to embodiments herein.

As shown in network environment 100-1 of FIG. 5, the first wireless access point 105-1 and the second wireless access point 105-2 can be disparately located with respect to each other.

In this example embodiment, the region of wireless coverage 507-1 provided by wireless access point 105-1 at least partially overlaps with the region of wireless coverage 507-2 provided by wireless access point 105-2. As previously discussed, when the communication device 120-1 roams outside of region of wireless coverage 507-1 into region of wireless coverage 507-2, the management resource 195 or other suitable resource initiates handoff of the communication session from the wireless access point 105-1 to wireless access point 105-2.

Figure 6:
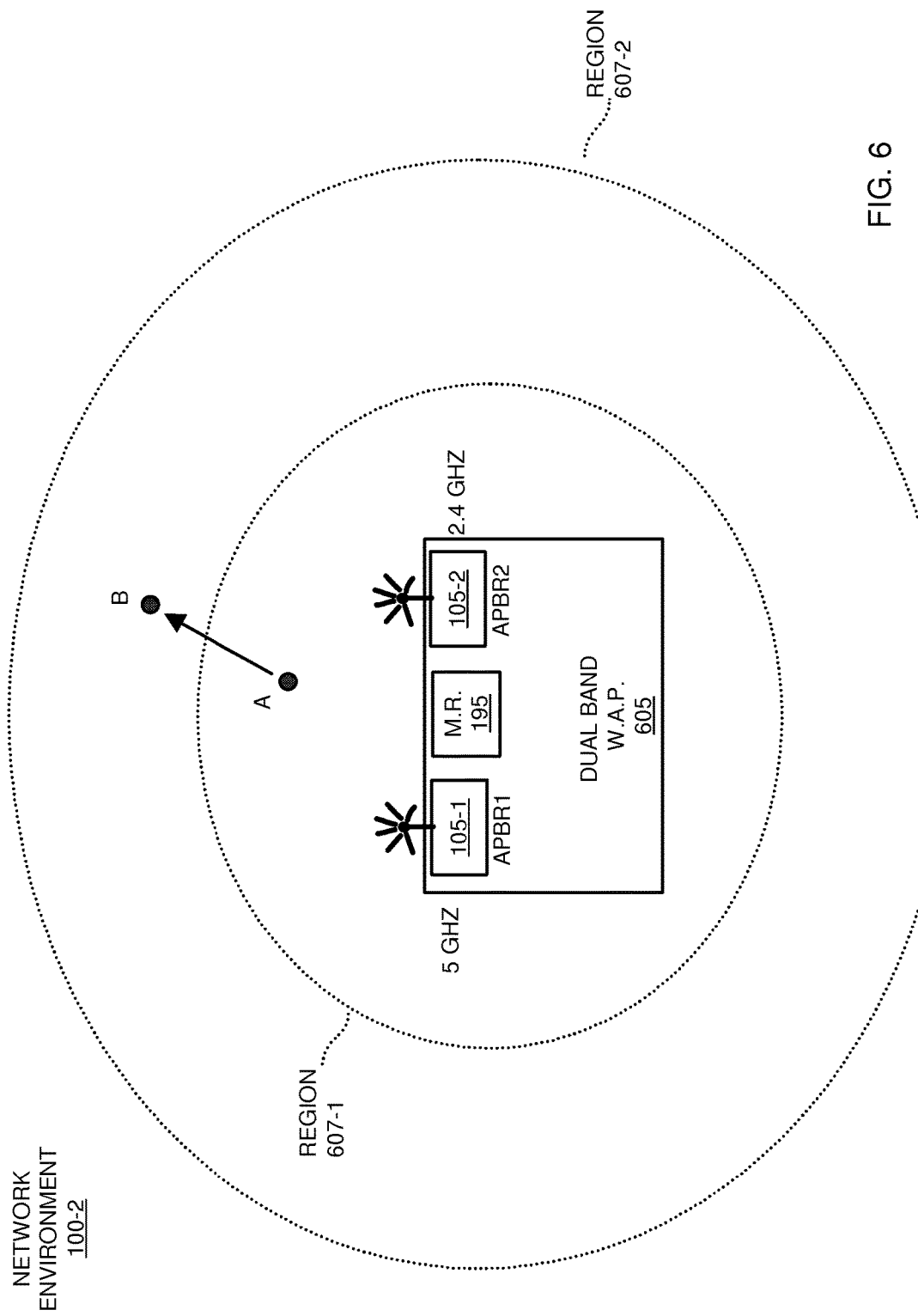
FIG. 6 is an example diagram illustrating overlapping wireless coverage provided by a dual band wireless access point and handoff of a wireless communication session from a first wireless access point to a second wireless access point according to embodiments herein.

FIG. 6 is an example diagram illustrating overlapping wireless coverage provided by a dual band wireless access point and handoff of a wireless communication session from a first wireless access point to a second wireless access point according to embodiments herein.

As shown in network environment 100-2 of FIG. 6, the dual band wireless access point can include multiple wireless access points that are co-located with respect to each other. In such an instance, the first wireless access point 105-1 supports communications over a first wireless band such as 5 GHz; the second wireless access point 105-2 supports communications over a second wireless band such as 2.4 GHz.

In one embodiment, the first wireless channel (wireless channel #1) and the second wireless channel (wireless channel #2) reside in non-interfering, adjacent wireless bands. Accordingly, both the first and second wireless access points can be disposed in a single dual radio access point 605. As previously discussed, the first wireless access point 105-1 supports transmission of communications over a first wireless channel; the second wireless access point supports transmission of communications over a second wireless channel.

Further in this example embodiment, management resource 195 can be disposed in the dual band wireless access point 605. In such an instance, the management resource serves as a cache for storing information that is readily available to both the first wireless access point 105-1 and the second wireless access point 105-2. As previously discussed, the (cached) information provided by the management resource 195 between wireless access points can include communication session information such as a session identifier associated with the communication session, encryption keys established to support the communication session, channel on which the handoff will occur (wireless channel #2 in this case), buffered communication session information, etc.

When transmitting in a wireless band around 5 GHz, the first wireless access point 105-1 provides a region of wireless coverage 607-1 in the network environment 100-2. In a concentric manner, when transmitting in a wireless band around 2.4 GHz, the second wireless access point 105-2 provides the region of wireless coverage 607-2 in the network environment 100-2.

In one embodiment, the communication device 120 initially establishes a communication session with the first wireless access point 105-1 when at location A. In response to detecting movement of the communication device 120 from location A to location B, in a manner as previously discussed, the management resource 195 associated with network environment 100 initiates a handoff of the communication session from wireless access point 105-1 to wireless access point 105-2.

Conversely, note that the communication device 120 can roam from location B back to location A again. In such an instance, the management resource 195 can be configured to initiate a handoff of the communication session from wireless access point 105-2 back to wireless access point 105-1.

Figure 7:
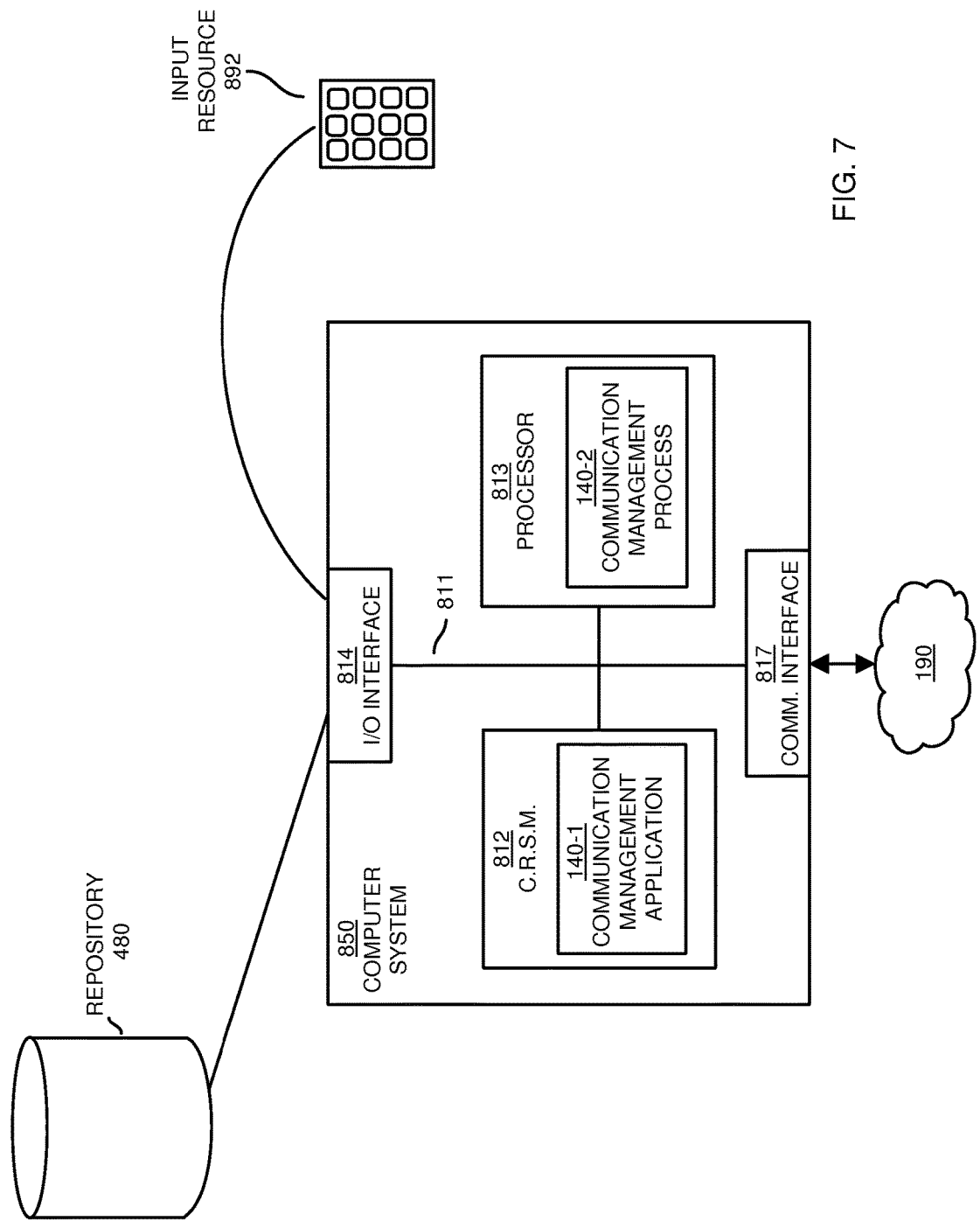
FIG. 7 is an example diagram illustrating computer processor hardware to carry out operations according to embodiments herein.

FIG. 7 is a diagram illustrating an example computer architecture in which to execute any of the functionality according to embodiments herein. Any of the different processing techniques can be implemented via execution of software code on computer processor hardware. Computer system 850 may reside in the communication device 120; computer system 850 may reside in a respective wireless access point; computer system may reside in the remote management resource 195; and so on.

As shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Note again that the computer system 850 can be located at any suitable locations in network environment 100 to carry out the operations as discussed herein. For example, computer processor hardware (i.e., processor 813 and/or computer system 850) and/or communication management application 140-1 can be located in a single location or can be distributed amongst multiple locations. Communication management application 140-1 can be configured to execute the operations as discussed with respect to management resource 195, communication device 120, wireless access point 105-1, wireless access point 105-2, and so on.

As its name suggests, I/O interface 814 provides connectivity to resources such as repository 480, input resource 892, one or more display screens, etc.

Computer readable storage medium 812 can be any hardware storage device to store data such as memory, optical storage, hard drive, floppy disk, etc. In one embodiment, the computer readable storage medium 812 stores instructions and/or data associated with communication management application 140-1.

Communications interface 817 enables the computer system 850 and processor resource 813 to communicate over a resource such networks 190. I/O interface 814 enables processor resource 813 to access data from a local or remote location, control a respective display screen, receive input, etc.

As shown, computer readable storage media 812 can be encoded with communication management application 140-1 (e.g., software, firmware, etc.) executed by processor 813. Communication management application 140-1 can be configured to include instructions to implement any of the operations as discussed herein associated with the communication device 120, wireless access point 105-1, wireless access point 105-2, management resource 195, etc.

During operation of one embodiment, processor 813 accesses computer readable storage media 812 via the use of interconnect 811 in order to launch, run, execute, interpret or otherwise perform the instructions in communication management application 140-1 stored on computer readable storage medium 812.

Execution of the communication management application 140-1 produces processing functionality such as communication management process 140-2 in processor resource 813. In other words, the communication management process 140-2 associated with processor resource 813 represents one or more aspects of executing communication management application 140-1 within or upon the processor resource 813 in the computer system 850.

Those skilled in the art will understand that the computer system 850 can include other processes and/or software and hardware components, such as an operating system that controls allocation and use of hardware resources to execute communication management application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

As previously discussed, the computer system 850 may reside at any location or multiple locations in network environment 100. The computer system 850 can be included in any suitable resource in network environment 100 to implement any of the functionality as discussed herein.

Functionality supported by the different resources will now be discussed via flowcharts in FIGS. 8-15. Note that the operations in the flowcharts below can be executed in any suitable order.

Figure 8:
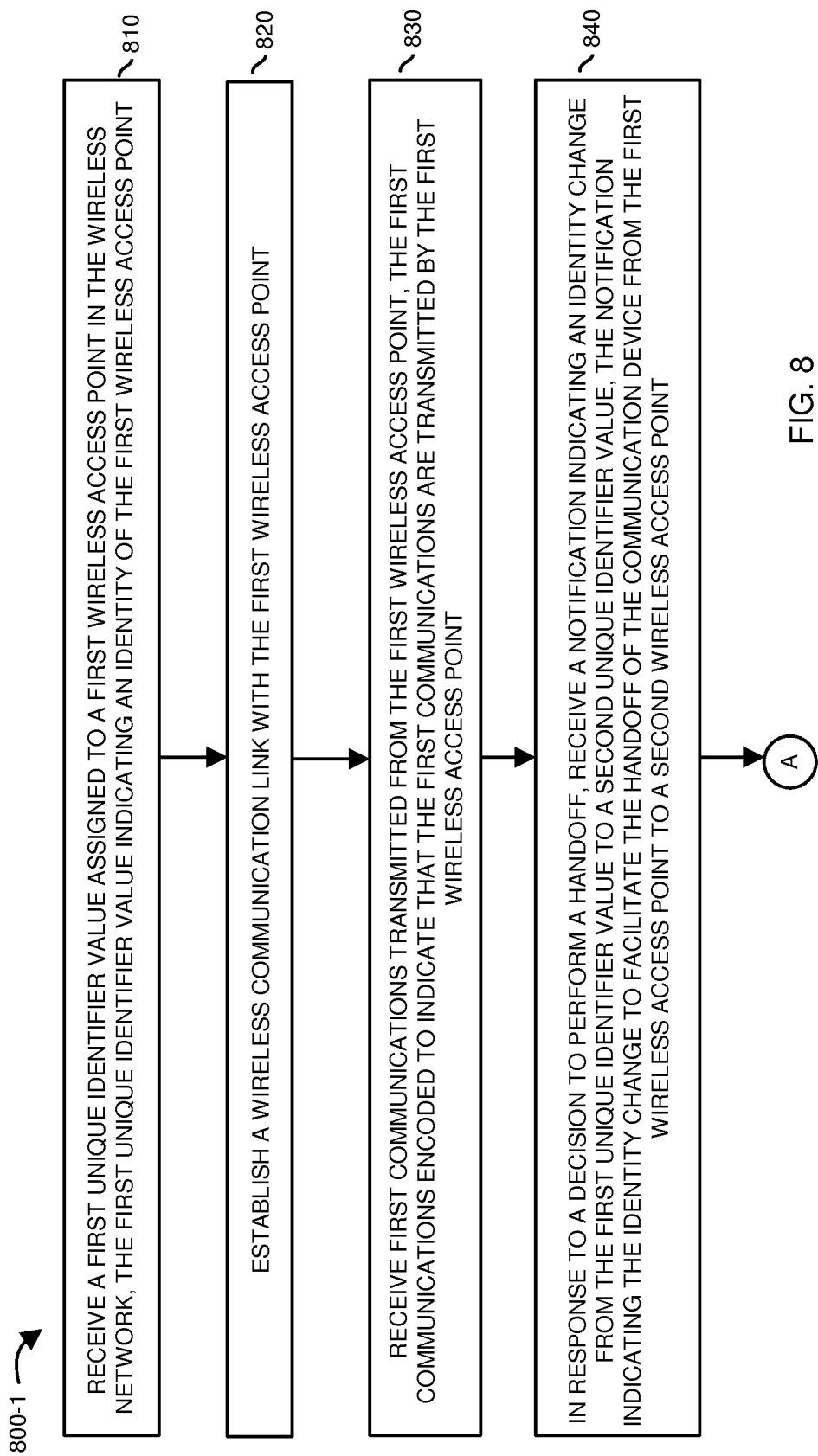
FIGS. 8-15 are example diagrams illustrating methods according to embodiments herein.
Figure 9:
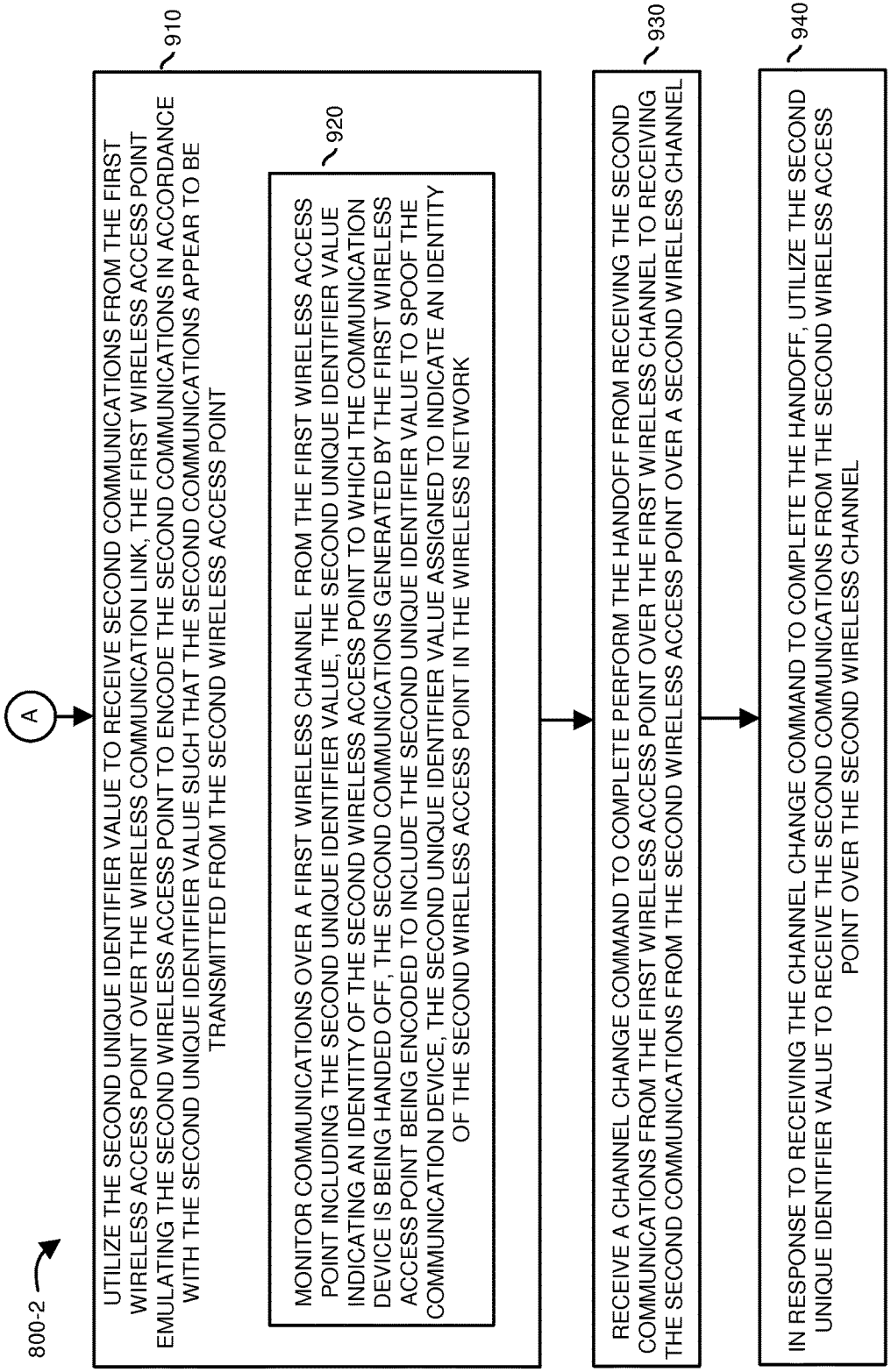

FIGS. 8 and 9 combine to form a flowchart 800 illustrating an example method according to embodiments herein.

Note that there will be some overlap with respect to concepts as discussed above such as with respect to FIGS. 1 and 2.

In processing operation 810 of flowchart 800-1 in FIG. 8, the communication device 120 receives a first unique identifier value APBR1 assigned to a first wireless access point 105-1 in the wireless network environment 100. The first unique identifier value indicates an identity (such as name, network address, etc.) of the first wireless access point 105-1.

In processing operation 820, the communication device 120 establishes a wireless communication link and corresponding wireless communication session with the first wireless access point 105-1. This can include using the unique identifier value APBR1.

In processing operation 830, the communication device 120 receives communications 171-1 transmitted from the first wireless access point 105-1. The first communications 171-1 are encoded with APBR1 to indicate that the first communications 171-1 are transmitted by the first wireless access point 105-1.

In processing operation 840, in response to a decision to perform a handoff, the first wireless access point 105-1 receives a notification 175 indicating an identity change from the first unique identifier value APBR1 to a second unique identifier value APBR2; the notification 175 indicates the identity change to facilitate the handoff of the communication session from the first wireless access point 105-1 to second wireless access point 105-2.

In processing operation 910 of flowchart 800-2 in FIG. 9, the communication device 120 utilizes the second unique identifier value APBR2 to identify and receive second communications 171-2 from the first wireless access point 105-1. The first wireless access point 105-1 emulates the second wireless access point 105-2 to encode the second communications 171-2 in accordance with the second unique identifier value APBR2 such that the second communications 171-2 appear to be transmitted from the second wireless access point 105-2 even though such communications 171-2 are transmitted from the first wireless access point 105-1.

In processing operation 920 associated with operation 910, the communication device 120 monitors communications received over the first wireless channel from the first wireless access point 105-1 including the second unique identifier value APBR2. The second unique identifier value APBR2 indicates an identity of the second wireless access point to which the communication device 120 is being handed off. The second communications 171-2 generated by the first wireless access point 105-1 are encoded to include the second unique identifier value APBR2 to spoof the communication device 120 that the communications 171-2 are transmitted from the second wireless access point 105-2.

In processing operation 930, the communication device 120 receives a channel change command 176 to complete the handoff from receiving further communications associated with the communication session from the second wireless access point 105-2 instead of from wireless access point 105-1.

In processing operation 940, in response to receiving the channel change command 176 to complete the handoff, the communication device 120 utilizes the second unique identifier value APBR2 to identify communications 172 transmitted from the second wireless access point 105-2 over the second wireless channel is indicated by the command 176. As previously discussed, a destination identifier value in the received communications 172 indicate which of the communications generated by the wireless access point 105-2 are directed to the communication device 120.

Figure 10:
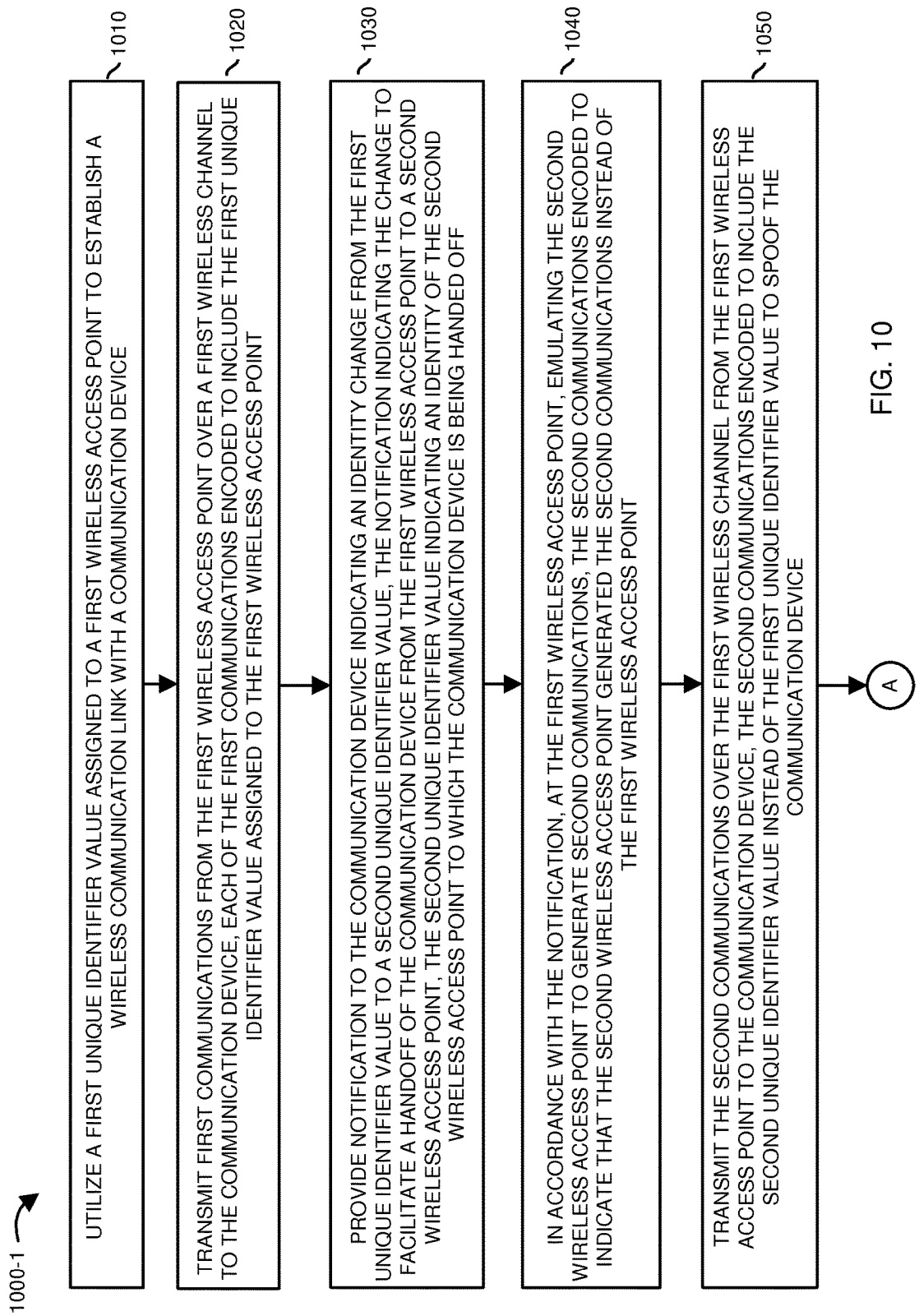
Figure 11:
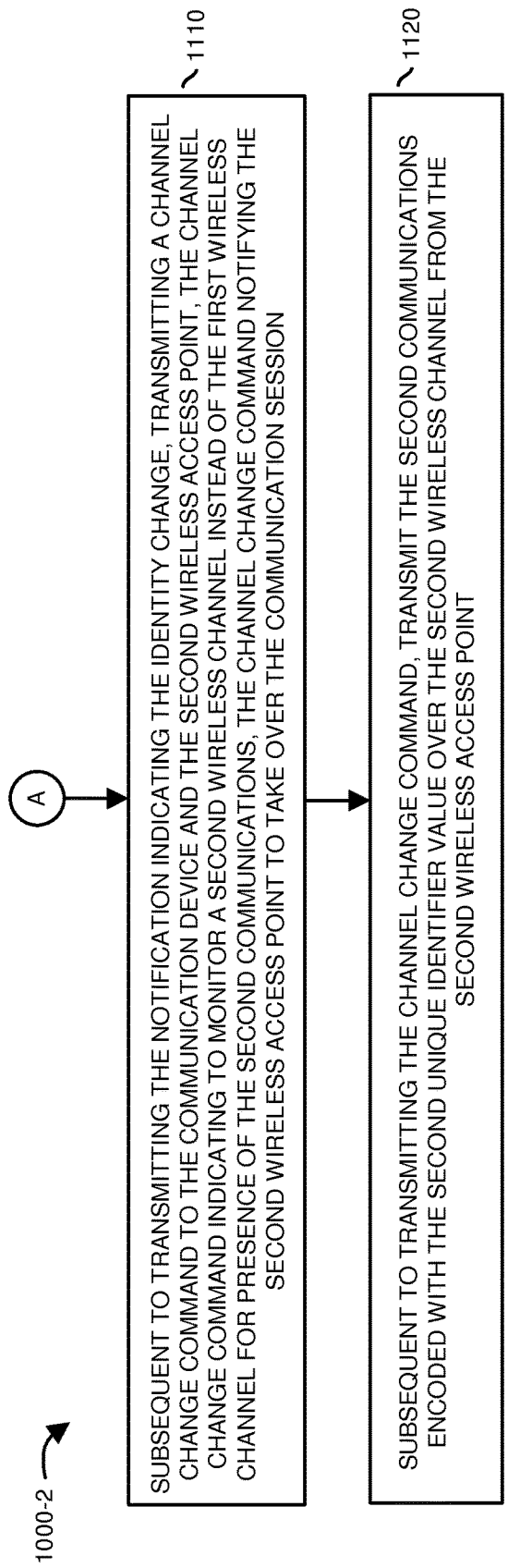

FIGS. 10 and 11 combine to form a flowchart 1000 illustrating an example method according to embodiments herein. Note that there will be some overlap with respect to concepts as discussed above such as with respect to FIGS. 1 and 2.

In processing operation 1010 of flowchart 1000-1 in FIG. 10, the first wireless access point 105-1 establishes a wireless communication link with communication device 120.

In processing operation 1020, the first wireless access point 105-1 transmits first communications 171-1 from the first wireless access point 105-1 over a first wireless channel to the communication device 120. Each of the first communications 171-1 is encoded to include the first unique identifier value APBR1 assigned to the first wireless access point 105-1.

In processing operation 1030, the first wireless access point 105-1 provides notification 175 to the communication device 120 indicating an identity change from the first unique identifier value APBR1 to a second unique identifier value APBR2. The notification 175 indicates the identity change to facilitate a handoff of the communication session from the first wireless access point 105-1 to the second wireless access point 105-2. The second unique identifier value APBR2 indicates an identity of the second wireless access point 105-2 to which the communication device 120 is being handed off.

In processing operation 1040, in accordance with the notification 175, the first wireless access point 105-1 emulates operations of the second wireless access point 105-2. For example, the first wireless access point 105-1 generates second communications 171-2 that are encoded to indicate that the second wireless access point 105-2 generated the second communications 171-2 even though the communications 171-2 are generated by the first wireless access point 105-1.

In processing operation 1050, the first wireless access point 105-1 transmits the second communications 171-2 over a first wireless channel (wireless channel #1) from the first wireless access point 105-1 to the communication device 120. The second communications 171-2 are encoded to include the second unique identifier value APBR2 instead of the first unique identifier value APBR1 to spoof the communication device 120.

In processing operation 1110 in flowchart 1000-2 in FIG. 11, subsequent to transmitting the notification 175 indicating the identity change, the first wireless access point 105-1 or other suitable resource transmits a channel change command 176 to the communication device and/or the second wireless access point 105-2. The channel change command 176 provides notification to the communication device 120 to monitor a second wireless channel (wireless channel #2) instead of the first wireless channel for presence of the second communications 172. Transmission of the channel change command 176 to the wireless access point 105-2 command notifies the second wireless access point 105-2 to take over handling communications associated with the corresponding communication session being handed off. In one embodiment, wireless channel #2 resides in a different frequency band than wireless channel #1. In other words, in one embodiment, the first wireless channel and the second wireless channel are non-overlapping in spectrum such that they do not interfere with each other.

In processing operation 1120, subsequent to transmitting the channel change command 176, the second wireless access point 105-2 transmits the communications 172 encoded with the second unique identifier value APBR2 over the second wireless channel from the second wireless access point 105-2.

Figure 12:
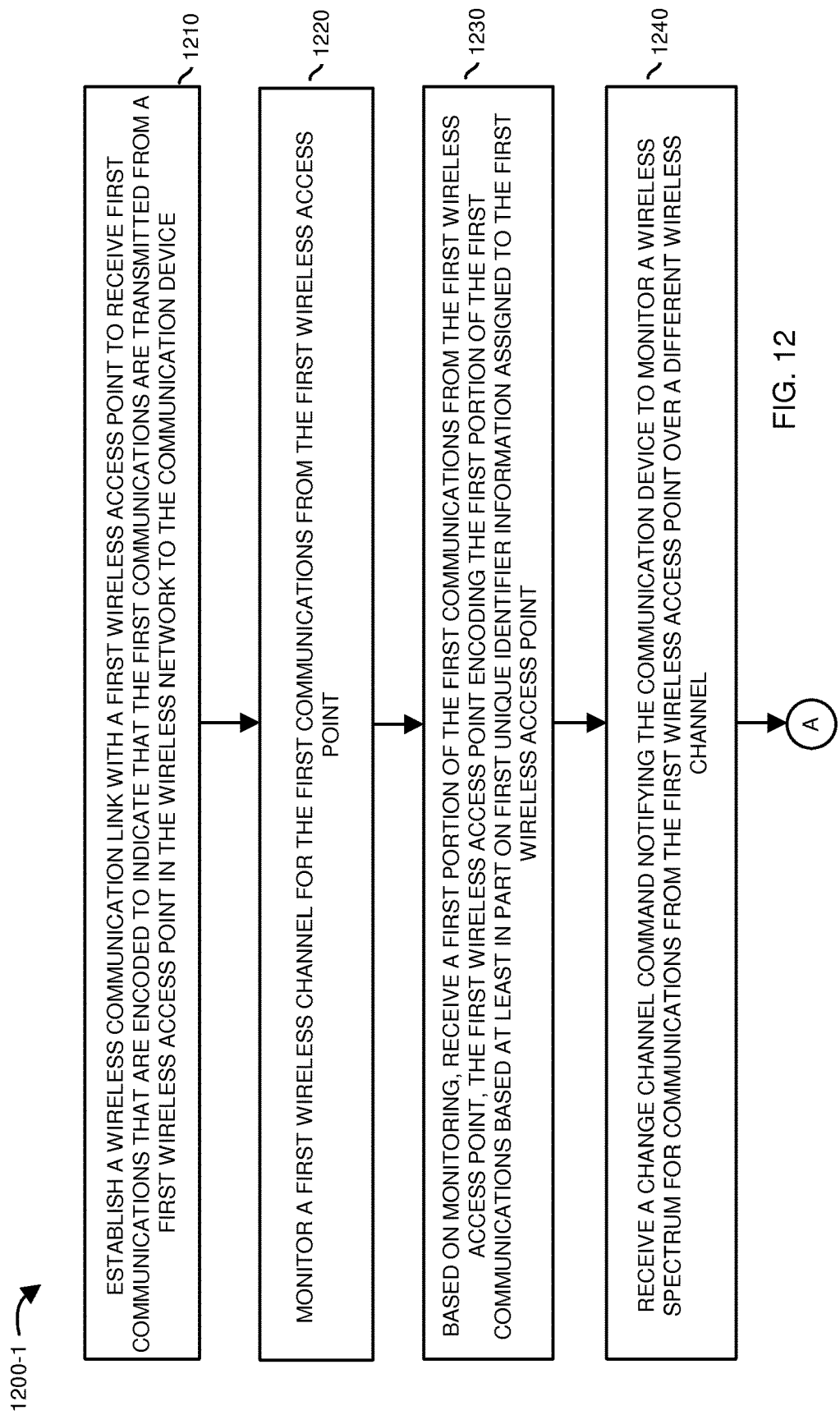
Figure 13:
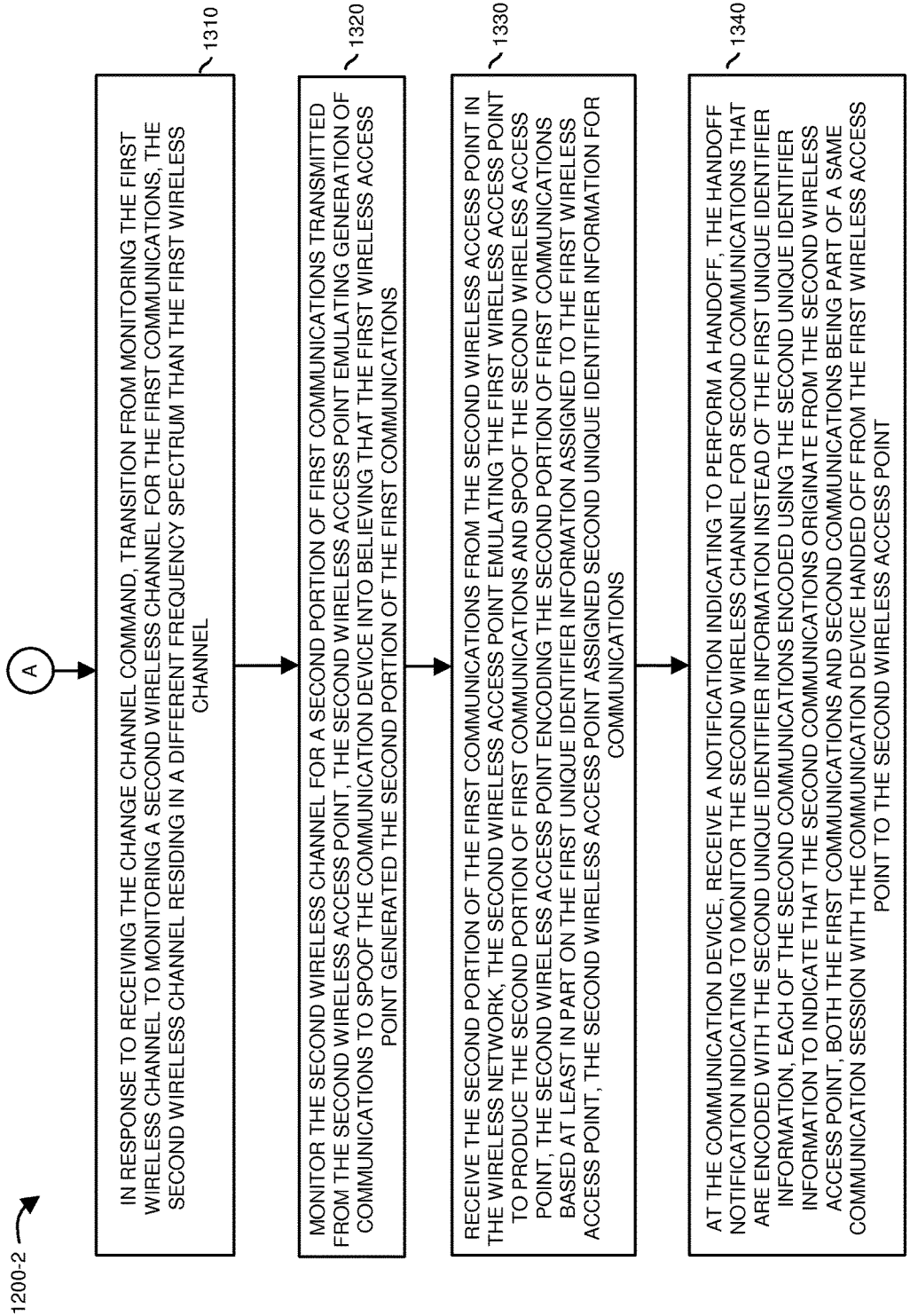

FIGS. 12 and 13 combine to form a flowchart 1200 illustrating an example method according to embodiments herein. Note that there will be some overlap with respect to concepts as discussed above such as with respect to FIGS. 3 and 4.

In processing operation 1210 of flowchart 1200-1 in FIG. 12, the communication device 120 establishes a wireless communication link and wireless communication session with first wireless access point 105-1.

In processing operation 1220, the communication device 120 monitors a first wireless channel (wireless channel #1) for communications from the first wireless access point 105-1.

In processing operation 1230, based on the monitoring, the communication device 120 receives communications 371-1 from the first wireless access point 105-1. The first wireless access point 105-1 encodes the communications 371-1 based at least in part on first unique identifier information APBR1 assigned to the first wireless access point 105-1, indicating that the communications 371-1 are transmitted from the first wireless access point 105-1.

In processing operation 1240, the communication device 120 receives change channel command 375 notifying the communication device 120 to monitor wireless channel #2 instead of wireless channel #1 for communications from the first wireless access point 105-1.

In processing operation 1310 in flowchart 1200-2, in response to receiving the change channel command 375, the communication device 120 transitions from monitoring the wireless channel #1 to monitoring wireless channel #2 for further communications from the wireless access point 105-1.

In processing operation 1320, the communication device 120 monitors the wireless channel #2 for communications 371-2 transmitted from the second wireless access point 105-2 over wireless channel #2. As further discussed below, the second wireless access point 105-2 performs emulation to generate communications 371-2 to spoof the communication device 120 into believing that the first wireless access point 105-1 generates the second portion of the first communications 371-2. More specifically, to spoof the communication device 120, the second wireless access point 105-2 encodes the communications 371-2 to include unique identifier value APBR1 assigned to wireless access point 105-1. As previously discussed, the second wireless access point 105-2 is assigned second unique identifier information APBR2 for generating transmitting communications. Thus, rather than using its own identity (APBR2) to generate corresponding communications 371-2, the wireless access point 105-2 uses the identity information APBR1 to generate the communications 371-2.

In processing operation 1330, the communication device 120 receives the communications 371-2 from the second wireless access point 105-2 in the wireless network environment 100. As previously discussed, the second wireless access point 105-2 emulates operations of the first wireless access point 105-1 to produce the communications 371-2 such that the communications 371-2 appear to be transmitted from the first wireless access point 105-1

In processing operation 1340, the communication device 120 receives notification 376 (such as a final hand off notification) indicating to complete performing the handoff of the communication session from the first wireless access point 105-1 to the second wireless access point 105-2. In one embodiment, the notification 376 notifies the communication device 120 to monitor wireless channel #2 for communications 372-2 that are encoded with source identifier APBR2 instead of the source identifier APBR1. Encoding of the communications 372-2 with the unique identifier value APBR2 indicates that the communications 372-2 originate and are transmitted from the second wireless access point 105-2. As described herein, communications 371-1, 371-2, and 372 are all part of the same communication session associated with communication device 120 that is handed off from the first wireless access point 105-1 to the second wireless access point 105-2.

Figure 14:
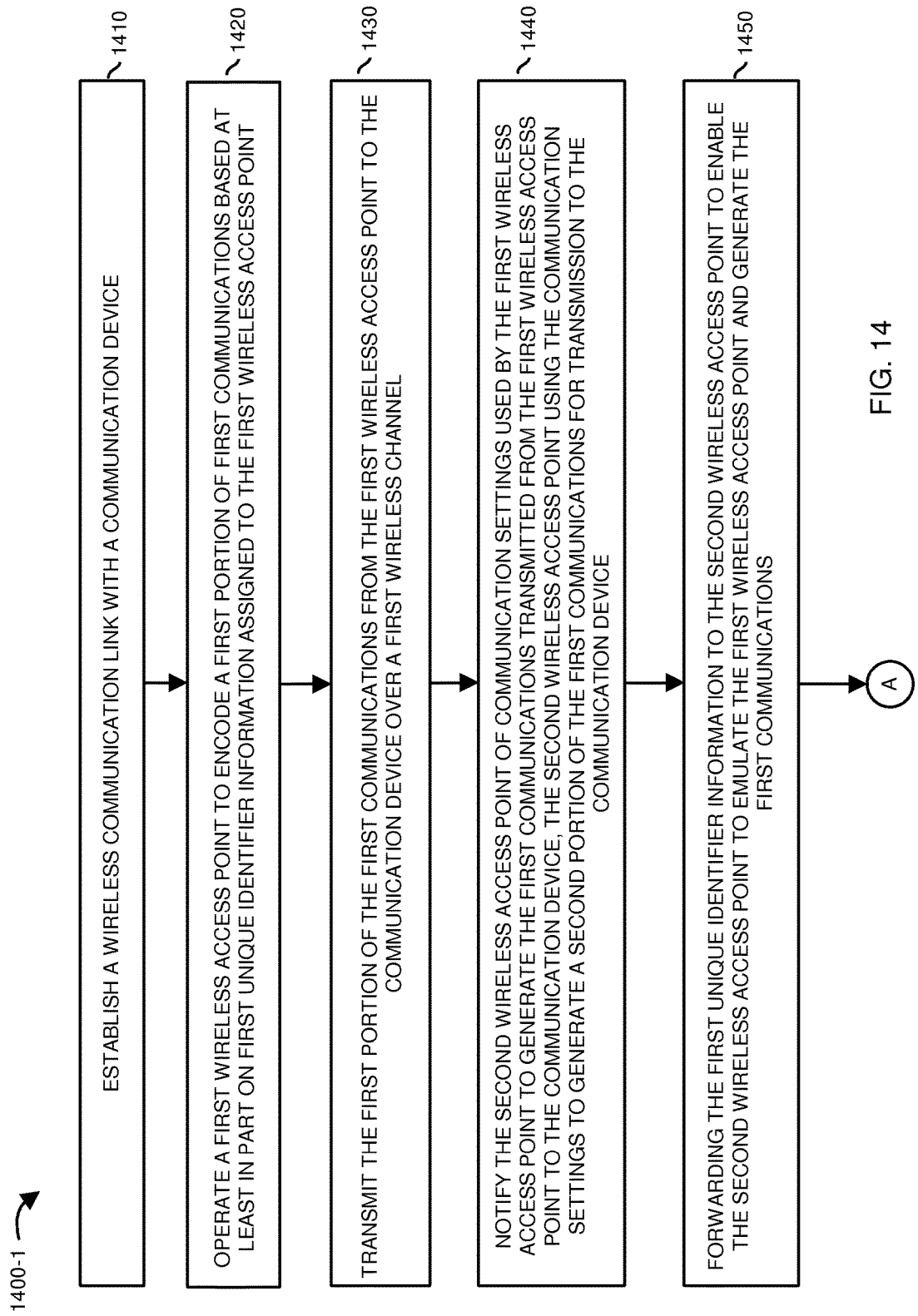
Figure 15:
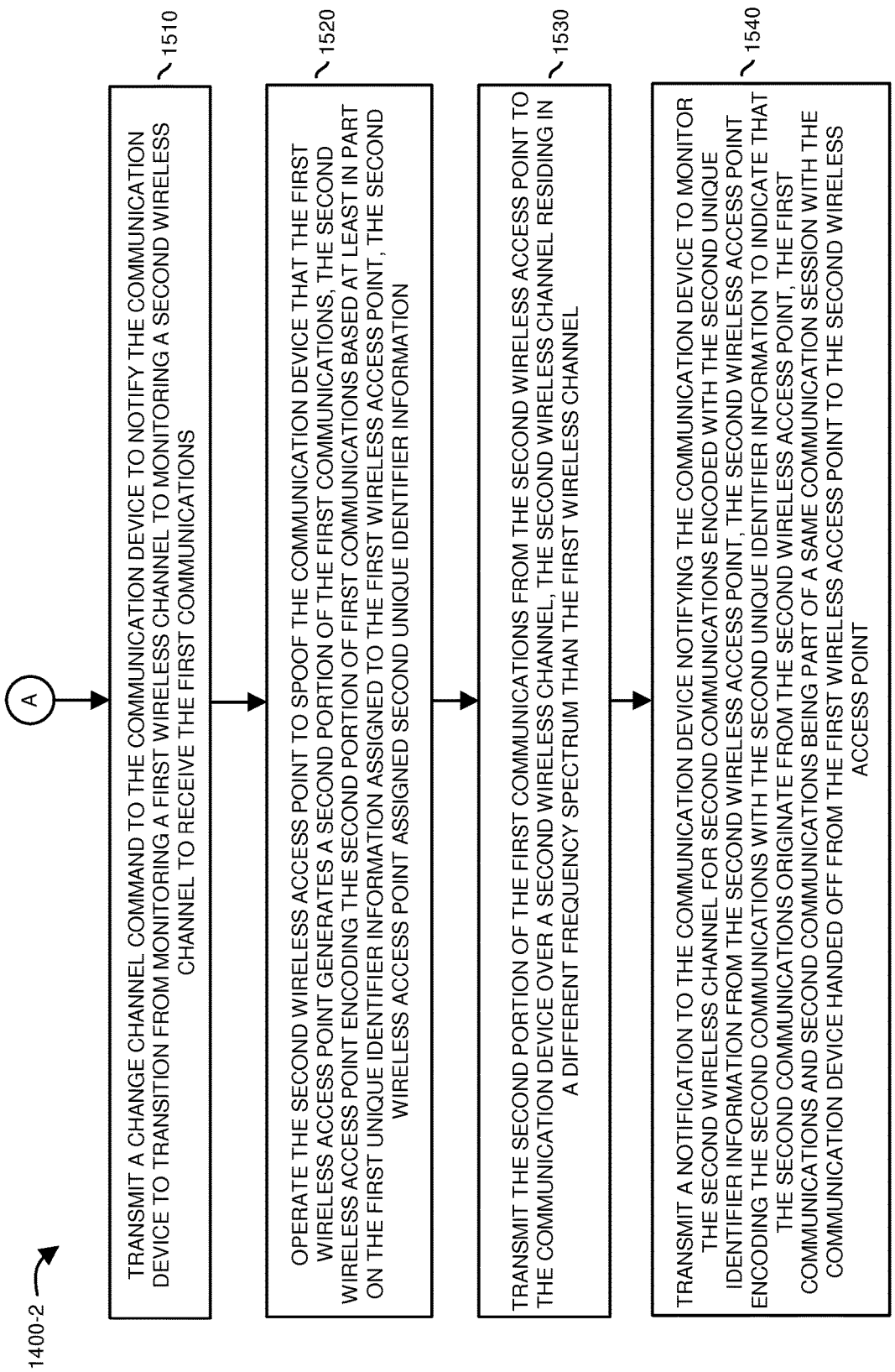

FIGS. 14 and 15 combine to form a flowchart 1400 illustrating an example method according to embodiments herein. Note that there will be some overlap with respect to concepts as discussed above such as with respect to FIGS. 3 and 4.

In processing operation 1410 of flowchart 1400-1 in FIG. 14, wireless access point 105-1 establishes a wireless communication link with the communication device 120.

In processing operation 1420, the first wireless access point 105-1 utilizes a first unique identifier value (such as APBR1) assigned to a first wireless access point 105-1 to establish a wireless communication link with communication device 120.

In processing operation 1430, the wireless access point 105-1 transmits communications 371-1 from the first wireless access point 105-1 over a first wireless channel (wireless channel #1) to the communication device 120. As previously discussed, each of the first communications 371-1 is encoded to include the first unique identifier value APBR1, indicating that such communications 371-1 are transmitted from the first wireless access point 105-1.

In processing operation 1440, the wireless access point 105-1 or other suitable resource notifies the wireless access point 105-2 of communication settings used by the first wireless access point 105-1 to generate the first communications 371-1 from the first wireless access point 105-1 to the communication device 120. As further discussed below, the second wireless access point 105-2 uses the communication settings associated with the communication session to generate communications 371-2 for transmission to the communication device 120.

In processing operation 1450, the wireless access point 105-1 or other suitable resource forwards first unique identifier information (such as APBR2) to the second wireless access point 105-2. This enables the second wireless access point 105-2 to emulate the first wireless access point 105-1 and generate communications 371-2. Encoding of the communications 371-2 with identity information APBR1 spoofs the communication device 120 into believing that the communications 371-2 are transmitted from the first wireless access point 105-1, even though the communications 371-2 are transmitted from the second wireless access point 105-2.

In processing operation 1510 of flowchart 1400-2 in FIG. 15, the first wireless access point 105-1 or other suitable resource transmits change channel command 375 to the communication device 120 to notify the communication device 120 to transition from monitoring first wireless channel (wireless channel #1) to monitoring second wireless channel (wireless channel #2) to receive subsequent communications 371-2.

In processing operation 1520, the second wireless access point spoofs the communication device 120 that the first wireless access point 105-1 generates communications 371-2 via encoding the communications 371-2 based at least in part on the first unique identifier information APBR1 assigned to the first wireless access point 105-1.

In processing operation 1530, the second wireless access point 105-2 transmits the communications 371-2 from the second wireless access point 105-2 to the communication device 120 over the second wireless channel.

In processing operation 1540, the wireless access point 105-2 or other suitable resource transmits notification 376 (such as an identity change command) to the communication device 120 notifying the communication device 120 to monitor the wireless channel #2 for communications 372 encoded with the second unique identifier information APBR2 indicating that the communications 372 originate and are transmitted from the wireless access point 105-2. As previously discussed, communications 371-1, communications 371-2, and communications 372 are part of a same communication session with the communication device handed off from the first wireless access point 105-1 to the second wireless access point 105-2.

Note again that techniques herein are well suited for supporting handoffs in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via computer processing hardware in a communication device operated in a wireless network, performing operations of:
        receiving a first unique identifier assigned to a first wireless access point in the wireless network, the first unique identifier indicating an identity of the first wireless access point;
        establishing a first wireless communication link to receive first communications transmitted from the first wireless access point;
        receiving a notification indicating an identity change from the first unique identifier to a second unique identifier, the second unique identifier indicating an identity assigned to a second wireless access point in the wireless network;
        utilizing the second unique identifier to receive second communications from the first wireless access point over the first wireless communication link; and
        wherein the second communications from the first wireless access point include the second unique identifier, the first wireless access point including the second unique identifier in the second communications to spoof the communication device that the second communications are received from the second wireless access point assigned the second unique identifier.

2. The method as in claim 1 further comprising:
    receiving the notification indicating the identity change to facilitate a handoff of the communication device from the first wireless access point to the second wireless access point.

3. The method as in claim 2, wherein the second unique identifier indicates the identity of the second wireless access point to which the communication device is being handed off; and
    wherein the first wireless access point temporarily uses the second unique identifier to communicate the second communications to the communication device.

4. The method as in claim 1, wherein the second communications are encoded to include the second unique identifier, the second unique identifier assigned to indicate the identity of the second wireless access point in the wireless network.

5. The method as in claim 4, wherein the second wireless access point is disparately located with respect to the first wireless access point.

6. The method as in claim 4 further comprising:
    in response to receiving a command to perform a handoff from receiving the second communications from the first wireless access point to receiving the second communications from the second wireless access point, utilizing the second unique identifier to receive the second communications from the second wireless access point.

7. The method as in claim 6 further comprising:
    performing the handoff from the first wireless access point to the second wireless access point without requiring the communication device to authenticate and associate itself with the second wireless access point.

8. The method as in claim 6, wherein the second wireless access point receives communication settings used by the first wireless access point to generate the first communications transmitted from the first wireless access point to the communication device, the second wireless access point using the communication settings to generate the second communications transmitted from the second wireless access point to the communication device, both the first communications and second communications part of a communication session handed off from the first wireless access point to the second wireless access point.

9. The method as in claim 1, wherein utilizing the second unique identifier to receive communications from the first wireless access point further comprises:
subsequent to receiving the notification indicating the identity change: discontinuing use of the first unique identifier to monitor and receive the first communications from the first wireless access point.

10. The method as in claim 1, wherein utilizing the second unique identifier to receive communications from the second wireless access point further comprises:
monitoring communications from the second wireless access point including the second unique identifier.

11. The method as in claim 1 further comprising:
receiving the first communications and a first portion of the second communications from the first wireless access point over a first wireless channel; and
subsequent to receiving the notification indicating the identity change, receiving a channel change command to monitor a second wireless channel for presence of a second portion of the second communications instead of the first wireless channel.

12. A method comprising:
via computer processing hardware in a communication device operated in a wireless network, performing operations of:
receiving a first unique identifier assigned to a first wireless access point in the wireless network, the first unique identifier indicating an identity of the first wireless access point;
establishing a first wireless communication link to receive first communications transmitted from the first wireless access point;
receiving a notification indicating an identity change from the first unique identifier to a second unique identifier, the second unique identifier indicating an identity assigned to a second wireless access point in the wireless network;
utilizing the second unique identifier to receive second communications from the first wireless access point over the first wireless communication link, the method further comprising:
receiving the first communications and a first portion of the second communications from the first wireless access point over a first wireless channel; and
subsequent to receiving the notification indicating the identity change, receiving a channel change command to monitor a second wireless channel for presence of a second portion of the second communications instead of the first wireless channel; and
in response to receiving the channel change command to monitor the second wireless channel instead of the first wireless channel, receiving the second portion of the second communications over the second wireless channel from the second wireless access point, the second portion of the second communications received from the second wireless access point encoded to indicate the second unique identifier.

13. The method as in claim 12 further comprising:
receiving the notification and channel change command in response to detecting movement of the communication device in the wireless network.

14. The method as in claim 13, wherein the first wireless channel and the second wireless channel reside in non-interfering, adjacent wireless bands.

15. The method as in claim 1, wherein the first wireless access point and the second wireless access point are disposed in a single dual radio access point, the first wireless access point supporting a first wireless channel, the second access point supporting a second wireless channel, the first communications and the second communications supporting a communication session initiated by the communication device with a remote server resource.

16. The method as in claim 15, wherein the first wireless access point in the single dual radio access point supports a first region of wireless coverage, the second wireless access point in the single dual radio access point supports a second region of wireless coverage, the second region of wireless coverage larger than the first region of wireless coverage, the method further comprising:
receiving the notification and channel change request in response to detecting movement of the communication device outside of the first region of wireless coverage into the second region of wireless coverage.

17. The method as in claim 1 further comprising:
receiving the first communications and a first portion of the second communications from the first wireless access point over a first wireless channel; and
subsequent to receiving the notification indicating the identity change, receiving a channel change command to monitor a second wireless channel for receiving a second portion of the second communications from the second wireless access point over the second wireless channel instead of the first wireless channel.

18. A computer system comprising:
computer processor hardware in a user-operated communication device operated in a wireless network; and
a hardware storage resource coupled to communicate with the computer processor hardware, the hardware storage resource storing instructions that, when executed by the computer processor hardware, causes the computer processor hardware to:
receive a first unique identifier assigned to a first wireless access point in the wireless network, the first unique identifier indicating an identity of the first wireless access point;
establish a first wireless communication link to receive first communications transmitted from the first wireless access point;
receive a notification indicating an identity change from the first unique identifier to a second unique identifier; and
utilize the second unique identifier to receive second communications from the first wireless access point over the first wireless communication link, the computer processor hardware further operable to:
receive the first communications and the second communications from the first wireless access point over a first wireless channel; and
subsequent to receiving the notification indicating the identity change, receive a channel change command to monitor a second wireless channel for presence of the second communications instead of the first wireless channel; and in response to receiving the channel change command to monitor the second wireless channel instead of monitoring the first wireless channel, receive the second communications over the second wireless channel from the second wireless access point, the second communications received from the second wireless access point encoded to indicate the second unique identifier.

19. The computer system as in claim 18, wherein the computer processor hardware is further operable to:

receive the notification indicating the identity change to facilitate a handoff of the communication device from the first wireless access point to a second wireless access point.

20. The computer system as in claim 19, wherein the second unique identifier indicates an identity of the second wireless access point to which the communication device is being handed off.

21. The computer system as in claim 18, wherein the second communications are encoded to include the second unique identifier, the second unique identifier assigned to indicate an identity of a second wireless access point in the wireless network.

22. The computer system as in claim 21, wherein the second wireless access point is disparately located with respect to the first wireless access point.

23. The computer system as in claim 21, wherein the computer processor hardware is further operable to:

in response to receiving a command to perform a handoff from receiving the second communications from the first wireless access point to receiving the second communications from the second wireless access point, utilize the second unique identifier to receive the second communications from the second wireless access point.

24. The computer system as in claim 23, wherein the computer processor hardware is further operable to:

perform the handoff from the first wireless access point to the second wireless access point without requiring the communication device to authenticate and associate itself with the second wireless access point.

25. The computer system as in claim 23, wherein the second wireless access point receives communication settings used by the first wireless access point to generate the first communications transmitted from the first wireless access point to the communication device, the second wireless access point using the communication settings to generate the second communications transmitted from the second wireless access point to the communication device, both the first communications and second communications part of a communication session handed off from the first wireless access point to the second wireless access point.

26. The computer system as in claim 18, wherein the computer processor hardware is further operable to:

subsequent to receiving the notification indicating the identity change: discontinue use of the first unique identifier to monitor and receive the first communications from the first wireless access point.

27. The computer system as in claim 18, wherein the computer processor hardware is further operable to:

receive the notification and channel change command in response to detecting movement of the communication device in the wireless network.

28. The computer system as in claim 27, wherein the first wireless channel and the second wireless channel reside in non-interfering, adjacent wireless bands.

29. Computer-readable storage hardware having instructions stored thereon, the instructions, when carried out by computer processor hardware, causing the computer processor hardware to:

receive a first unique identifier assigned to a first wireless access point in the wireless network, the first unique identifier indicating an identity of the first wireless access point;

establish a first wireless communication link to receive first communications transmitted from the first wireless access point;

receive a notification indicating an identity change from the first unique identifier to a second unique identifier;

utilize the second unique identifier to receive second communications from the first wireless access point over the first wireless communication link; and wherein the second communications from the first wireless access point include the second unique identifier, the first wireless access point including the second unique identifier in the second communications to spoof the communication device that the second communications are received from a second wireless access point assigned the second unique identifier.

30. The method as in claim 1, wherein the second unique identifier is a source identifier value assigned to the second wireless access point, the second wireless access point disparately located with respect to the first wireless access point.

31. A method comprising:

via computer processing hardware in a communication device operated in a wireless network, performing operations of:

receiving a first unique identifier assigned to a first wireless access point in the wireless network, the first unique identifier indicating an identity of the first wireless access point;

establishing a first wireless communication link to receive first communications transmitted from the first wireless access point;

receiving a notification indicating an identity change from the first unique identifier to a second unique identifier, the second unique identifier indicating an identity assigned to a second wireless access point in the wireless network;

utilizing the second unique identifier to receive second communications from the first wireless access point over the first wireless communication link;

wherein the second unique identifier is a source identifier value assigned to the second wireless access point, the second wireless access point disparately located with respect to the first wireless access point; and wherein the first wireless access point temporarily uses the second unique identifier assigned to the second wireless access point to communicate the second communications to the communication device prior to a handoff of the communication device from the first wireless access point to the second wireless access point.

32. A method comprising:

via computer processing hardware in a communication device operated in a wireless network, performing operations of:

receiving a first unique identifier assigned to a first wireless access point in the wireless network, the first unique identifier indicating an identity of the first wireless access point;

establishing a first wireless communication link to receive first communications transmitted from the first wireless access point;

receiving a notification indicating an identity change from the first unique identifier to a second unique identifier, the second unique identifier indicating an identity assigned to a second wireless access point in the wireless network;

utilizing the second unique identifier to receive second communications from the first wireless access point over the first wireless communication link;

prior to receiving the notification, receiving the first communications from the first wireless access point over a first channel; and subsequent to utilizing the second unique identifier to receive second communications from the first wireless access point over the first wireless communication link, and in response to receiving a channel change command indicating to switch to receiving communications over a second channel, utilizing the second unique identifier to identify communications directed to the communication device from the second wireless access point over the second channel.

33. The method as in claim 11, wherein each of the second communications includes the second identifier.

34. The method as in claim 1, wherein each of the first communications includes the first unique identifier as a respective source identifier of a source originating a respective first communication;

wherein each of the second communications includes the second unique identifier as a respective source identifier of a source originating a respective second communication.

35. The method as in claim 1 further comprising:

receiving a first portion of the second communications including the second unique identifier over the first wireless communication link from the first wireless access point; and receiving a second portion of the second communications including the second unique identifier over a first wireless communication link from the second wireless access point.

* * * * *